US007263655B1

(12) United States Patent
Carden, Jr.

(10) Patent No.: US 7,263,655 B1
(45) Date of Patent: *Aug. 28, 2007

(54) SYSTEM AND METHOD FOR PUBLISHING MANUSCRIPTS

(75) Inventor: William T. Carden, Jr., Charlottesville, VA (US)

(73) Assignee: Thomson Scientific Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/576,386

(22) Filed: May 22, 2000

Related U.S. Application Data

(60) Provisional application No. 60/135,435, filed on May 21, 1999.

(51) Int. Cl.
*G06F 17/00* (2006.01)
*G06F 15/00* (2006.01)
(52) U.S. Cl. .................... 715/530; 715/511; 715/500.1
(58) Field of Classification Search ................ 715/511, 715/530, 500.1
See application file for complete search history.

(56) References Cited

U.S. PATENT DOCUMENTS

| | | | |
|---|---|---|---|
| 5,181,162 A | 1/1993 | Boer et al. | |
| 5,220,657 A | 6/1993 | Bly et al. | |
| 5,664,183 A | 9/1997 | Cirulli et al. | |
| 5,671,428 A | 9/1997 | Muranaga et al. | |
| 5,706,452 A * | 1/1998 | Ivanov | 345/751 |
| 5,745,360 A | 4/1998 | Leone et al. | |
| 5,778,367 A | 7/1998 | Coley et al. | |
| 5,799,191 A | 8/1998 | Moriyasu et al. | |
| 5,870,552 A | 2/1999 | Dozier et al. | |
| 5,890,177 A | 3/1999 | Moody et al. | |
| 5,892,909 A | 4/1999 | Grasso et al. | |
| 5,893,109 A | 4/1999 | DeRose et al. | |
| 5,948,040 A * | 9/1999 | DeLorme et al. | 701/201 |
| 5,987,454 A * | 11/1999 | Hobbs | 707/4 |
| 6,088,702 A | 7/2000 | Plantz et al. | |
| 6,336,124 B1 * | 1/2002 | Alam et al. | 715/523 |
| 6,374,274 B1 * | 4/2002 | Myers et al. | 715/523 |

FOREIGN PATENT DOCUMENTS

WO    WO94-08310    4/1994

(Continued)

OTHER PUBLICATIONS

International Preliminary Examination Report (IPER) from PCT application PCT/US00/03415, Jan. 18, 2001.

(Continued)

*Primary Examiner*—Heather R. Herndon
*Assistant Examiner*—N Hillery
(74) *Attorney, Agent, or Firm*—Venable, LLP; James R. Burdett; Jeffri A. Kaminski

(57) ABSTRACT

A publishing system includes a database that is adapted to store a plurality of documents, a plurality of computers, each of which is adapted to be coupled to the database; a network connecting the plurality of computers together for communication of data relating to the plurality of documents among the plurality of computers and the database, means for submitting a new document to the database, means for reviewing the new document, means for relating the new document to the plurality of documents, and means for publishing a journal of a selected portion of the plurality of documents. The plurality of computers includes a server and a plurality of clients, and the server is a web server with the plurality of clients each further including a browser.

58 Claims, 30 Drawing Sheets

FOREIGN PATENT DOCUMENTS

| | | |
|---|---|---|
| WO | WO 94-08310 | 4/1994 |
| WO | WO 98-01807 | 1/1998 |
| WO | WO98-01807 | 1/1998 |
| WO | WO99/04370 | 1/1999 |

OTHER PUBLICATIONS

International Search Report (ISR) from PCT application PCT/US00/03415, May 15, 2000.
ISR from PCT application PCT/US00/14097, Dec. 4, 2000.
Written Opinion from PCT/US00/14097, Jun. 1, 2001.
IPER from PCT application PCT/US00/14097, Nov. 21, 2001.
Supplemental European Search Report from EP application 00937677.3, Feb. 3, 2004.
Office Action for U.S. Appl. No. 09/501,169, filed Jul. 25, 2003.
Office Action for U.S. Appl. No. 09/510,169, filed Dec. 30, 2003.
Tribute A: "Sll Adopts Lotus Notes As Basis For Its New Editorial Systems. (Cover Story)" Seybold Report on Publishing Systems, Media, PA, US, vol. 28, No. 3, Oct. 12, 1998, pp. 1-8, XP002934600.
Susan Florio, "Notes R5: Calendar & Scheduling" Internet Article, 'Online! Dec. 1, 1998, XP002348509.

\* cited by examiner

SYSTEM AND METHOD FOR PUBLISHING MANUSCRIPTS

CROSS-REFERENCE TO RELATED APPLICATIONS

This application is related to a provisional patent application Ser. No. 60/135,435, filed May 21, 1999 by William T. Carden, Jr., entitled "Internet Accessed Manuscript Submission and Publication System", and a non-provisional patent application Ser. No. 09/501,169, filed Feb. 9, 2000, entitled "System and Method for Publishing Documents", both of which are commonly assigned to the assignee of the present invention and incorporated herein by reference.

BACKGROUND OF THE INVENTION

1. Field of the Invention

The present invention is related generally to manuscript publishing systems and methods, and more particularly to such systems and methods that enable authors to submit manuscripts, articles, and other text, graphics, and multimedia documents through computer networks in order to facilitate the substantially immediate review, editing and publishing of such documents.

2. Statement of the Invention

The submission, review, acceptance, and publication of manuscripts, particularly written materials, is a lengthy and time-consuming process using the conventional procedures known in the prior art. The "World Wide Web" (more commonly referred to as the "Internet") has dramatically decreased the time needed to communicate such manuscripts to a publisher. However, there are still difficulties that are encountered in handling most forms of written material. The written materials, once submitted, are centrally filed and managed through every step of their review and approval between their initial submission and final publication. From an author's perspective, it would be easy to simply attach a document to an "e-mail", and send that e-mail and document to a publisher for publication. However, it would still be difficult for the author to monitor the publisher's approval process. That process, too, would require the publisher to read, sort, and handle thousands of randomly formatted documents—a monumental task for any organization.

In a preferred embodiment of the present invention, a centralized system that avoids such problems is provided. Such a system enables an author to submit text, graphics, and multimedia documents to a second party through the Internet. Moreover, the system overcomes management problems by enabling a second party or "publishing authority" (e.g., a society, corporation, central organization, publisher, etc.) to easily process standardized materials, from receipt to publication, via the Internet.

SUMMARY OF THE INVENTION

The disclosed system and methods enable authors to submit written manuscripts to a publisher, society or agency, preferably through the Internet, for immediate review, editing and publishing. All "correspondence", review, and approval of such manuscripts is handled through the Internet, and stored centrally for subsequent access by appropriate parties in order to complete the submission to publication process.

One of the unique features of the present invention is its flexibility and ease of modification to accommodate any specific publisher or agency requirements. Preferably, the system is hosted on a central service provider's computer, and accessed by all involved parties from that site. This architecture enables a third-party service provider to maintain the program and, thus, free subscribing publishers from any need to monitor the system. The use of a database that automatically stores the materials in the desired format enables the service provider to easily display manuscripts online, print such manuscripts in hard copy or portable data file format, or transfer to a CD-ROM for presentation. Manuscripts originally transmitted by the author to the database in ASCII format are dynamically changed by the system to generate an HTML or PDF proof for review by the author. Such use of HTML (and successor formats to HTML, e.g., SGML, VRML, XML) provides a universal format, which facilitates online proofing, review by experts, scheduling of presentations, and subsequent publishing to hard copy or digital formats.

In accordance with a general embodiment of the present invention, the publishing system generally comprises a database adapted to store a plurality of manuscripts; a plurality of computers, each of which is adapted to be coupled to the database; a network connecting the plurality of computers together for communication of data relating to the plurality of manuscripts among the plurality of computers and the database; means for submitting a new manuscript to the database; means for reviewing the new manuscript; means for relating the new manuscript to the plurality of manuscripts; and means for publishing a journal of a selected portion of the plurality of manuscripts. The plurality of computers preferably comprise a server and a plurality of clients. More preferably, the server comprises a web server and the plurality of clients each further comprise a browser.

The submitting means further comprises first means for translating the new manuscript from a first data format to a second data format. Most preferably, the first data format comprises a native word processor format and the second data format comprises a format compatible to the browser. The publishing means additionally comprises second means for translating the selected portion of the plurality of manuscripts from the second data format to a third data format. Preferably, the third data format comprises a format that is selected from conventional typesetting/page layout formats (e.g., PostScript or PDF).

In an especially preferred embodiment of the present invention, the server further comprises means for searching the database. The system may likewise comprise a removable medium, which is adapted to store the database and includes the means for searching the database. In that case, the removable medium may further comprise means for communicating with the server, preferably by way of the browser.

A publishing method according to the present invention generally comprises a multi-step process. First, a suitable computer system is provided at one location. The computer system comprises a database that is adapted to store a plurality of manuscripts, a plurality of computers including a web server and a plurality of clients, each of which is adapted to be coupled to the database through a browser, and a network connecting the plurality of computers together for communication of data relating to the plurality of manuscripts among the plurality of computers and the database. Second, a new manuscript is input to the computer system from another location displaced remotely from the one location, the new manuscript having been input in a native word processor format. Third, the new manuscript is translated from the native word processor format to a format compatible with the browser, then stored. The new manuscript is then related to the plurality of manuscripts, and accessed in the browser-compatible format. Review and approval of the new manuscript is subsequently done in the browser-compatible format. Then, the new manuscript is translated from the browser-compatible format to a typesetting format. Publication of a journal of a selected portion of the plurality of manuscripts is ultimately done in the typesetting format, the browser-compatible format, or any suitable portable document file format.

Once the manuscript is submitted, the method then comprises the step of assigning a plurality of peer reviewers to review the new manuscript, the peer reviewer being located at a third location displaced remotely from the one location and the other location. The peer reviewer may then be notified through the network that the new manuscript is available for review. Similarly, approval may be done through the same steps.

In another embodiment of the present invention, the publishing system generally comprises a database adapted to store a plurality of manuscripts, each of which was written by one or more authors in a native word processor format; first server means for managing the database; second server means for hosting an Internet website that is accessible by a plurality of clients, each of which is adapted to be coupled to the database through a browser; a first code segment for submitting a new manuscript to the database in the native word processor format; a second code segment for translating the new manuscript from the native word processor format to a browser-compatible format; a third code segment for reviewing the new manuscript in the browser-compatible format; a fourth code segment for relating the new manuscript to the plurality of manuscripts; a fifth code segment for translating the plurality of manuscripts from the browser-compatible format to a typesetting format; and means for publishing the journal in the typesetting format of a selected portion of the plurality of manuscripts. It is noted at this juncture that, by use of the term "journal" herein, the invention is not deemed to be limited to journals per se. A book, proceedings, compilation, corporate publication or marketing collateral, web page, "e-zine", etc. each is deemed to fall within the scope of the present invention.

Other objects, advantages, and novel features of the present invention will become readily apparent from the following detailed description thereof, when considered in conjunction with the accompanying drawings wherein:

DETAILED DESCRIPTION OF THE INVENTION

Figure 1:
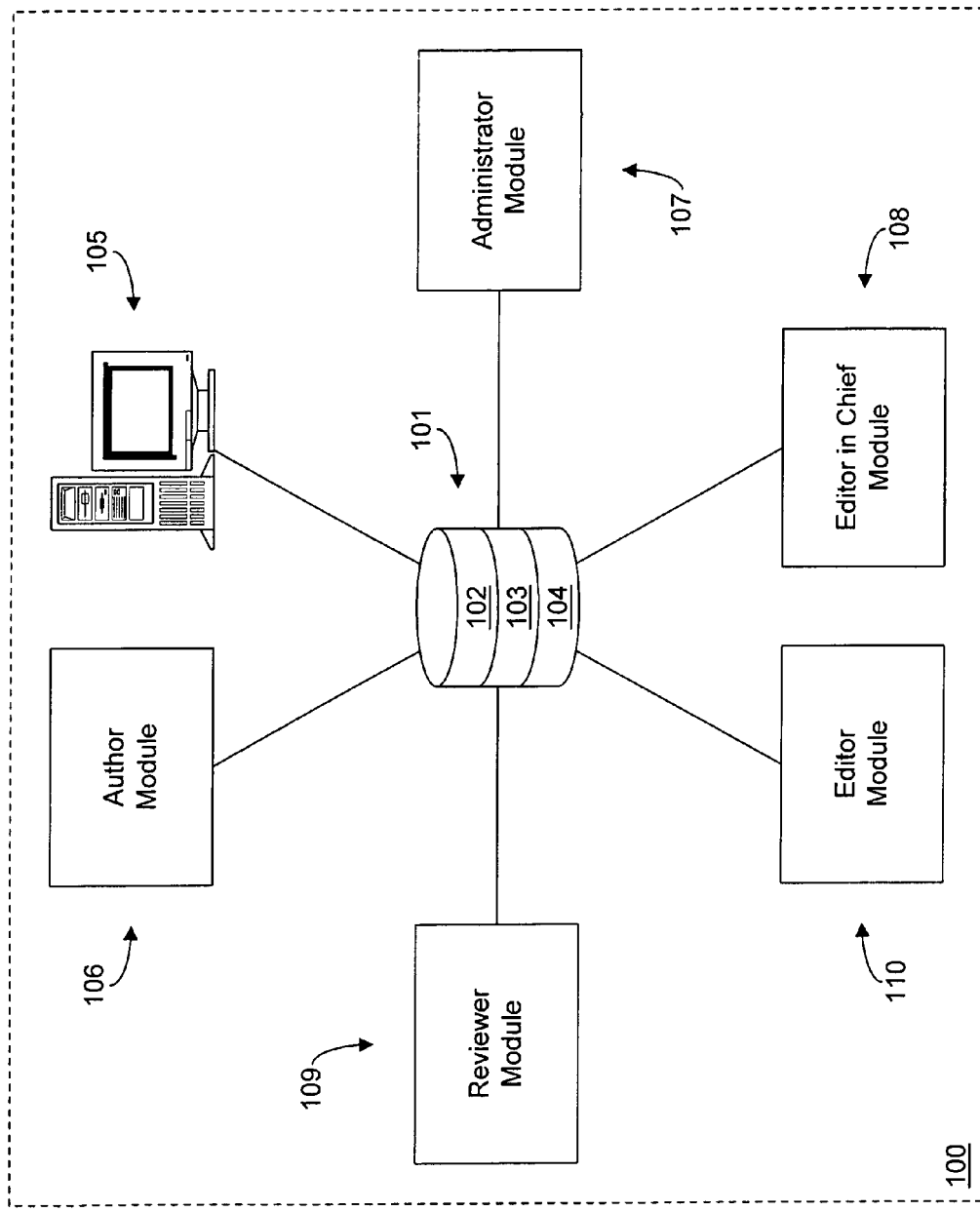
FIG. 1 is a block diagram of an online document processing system according to the present invention.

The system disclosed herein below enables authors to submit manuscripts, articles, graphics, multimedia, and other written materials through the Internet, thereby permitting the submitted materials to be immediately available for review, editing and publishing. Prior art methods require the mailing or e-mailing of materials from author to publisher, from publisher to reviewer, reviewer to publisher, etc. In the disclosed system, however, all such correspondence is handled through the Internet, and the appropriate parties to complete the submission to the publication process access centrally-stored materials. It is noted at this juncture that, within the disclosed system, use of the term "publication" refers to any display of any written or multimedia materials, whether it is by way of the Internet (including "intranets", "extranets", and "virtual private networks"), CD-ROM, or hard copy. Although one of the most applicable uses of the disclosed system is the submission of manuscripts for meetings and publications, the system can readily be adapted to other submissions, such as SBIR, STTR and/or NIH grants, academic applications or examinations, corporate proposals and the like.

Adaptation of the system for internal use, especially within companies having a number of corporate sites, enables the submission and review of proposals, contracts, promotional materials, etc., to be handled efficiently and rapidly. The processing of a submitted manuscript may vary according to the particular publication, and the flow of the systems disclosed herein are by way of example only and do not, in any way limit the invention. The disclosed system is applicable for Internet submission, review, revision and publication of any written data, video, multimedia, streaming video and, although for brevity reference will be made herein to submissions to societies, it is not limited to the examples provided herein. Security features, such as encrypting, access codes, etc., can also be required, dependent upon the parties, and will be obvious to those skilled in the art.

One of the unique features of the disclosed system is its flexibility and ease of modification to accommodate any specific publisher requirements. The system is preferably hosted on a central service provider's computer and accessed by all involved parties from that site. Publications and societies subscribe to the service provider's service, at which point all authors, editors, reviewers, and administrative or editorial staff only need to access the appropriate module on the site. This enables the service provider to maintain the program, freeing the subscribing publishers from any need to monitor the system. Use of a database that automatically stores the materials in the desired format enables the service provider to easily display the material on line, print in hard copy or transfer to a CD-ROM for presentation. The written materials may be originally transmitted from the author to the database in ASCII format, and the system dynamically generates an HTML proof for review by the author. Alternatively, the original manuscript may be transmitted in a native format (e.g., PostScript, PDF, or rich text formats). Use of the HTML format, thus, provides a universal format permitting the online proofing, review by experts, scheduling of presentations and publishing to the public. Alternatively, the system can be installed on a specific publisher's computer system, and various participants can interact directly with such computer system.

The system enables dynamic e-mails to the parties interacting in the process to acknowledge the states of the materials. Dynamic e-mails are advantageous in notifying the involved parties of the current states of the written materials, such as notifying a reviewer of a manuscript to be reviewed or confirming a presentation time to a speaker.

Figure 2:
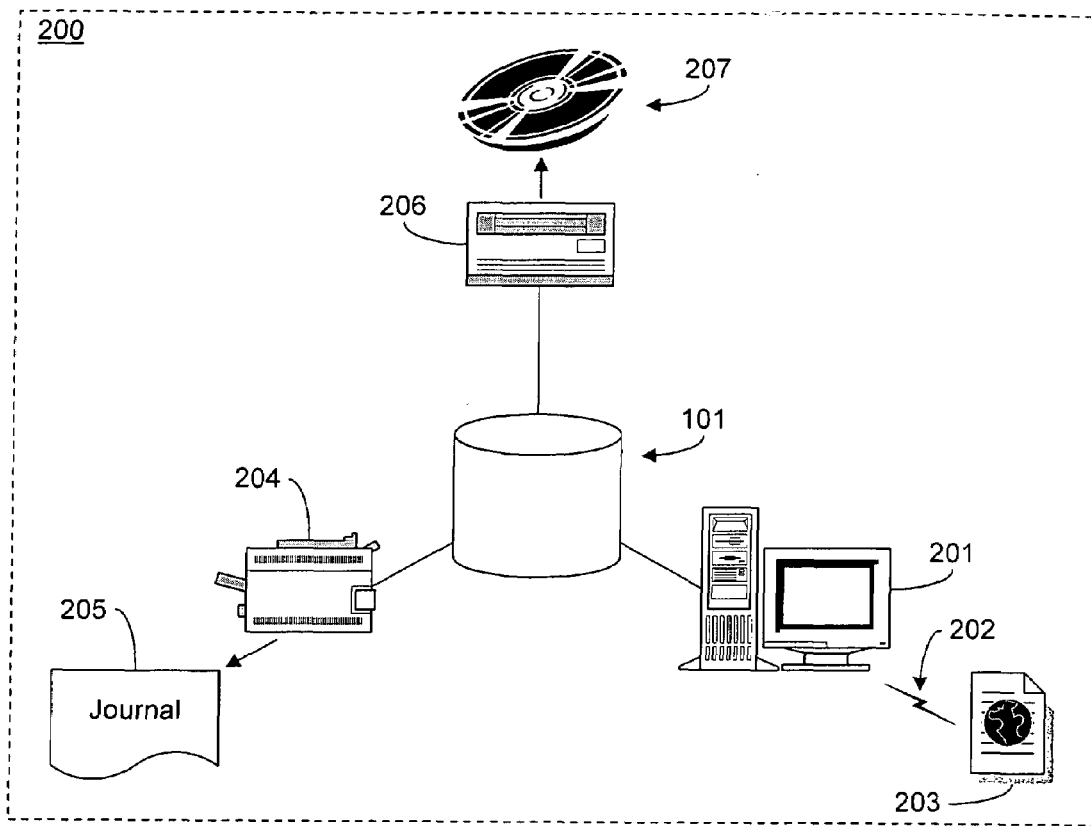
FIG. 2 illustrates various methods of publishing, which use the online document processing system shown in FIG. 1.

Referring now to the drawings, wherein like reference characters and numerals designate like or corresponding parts throughout each of the several views, there is shown in FIG. 1 an online document processing system 100 according to the present invention. System 100 broadly includes a database 101 (which may be split, e.g., into partitions 102, 103, 104), a server 105 connected to the database 101, and five basic modules 106, 107, 108, 109, and 110. Author module 106 is used by authors to submit their documents for consideration by administrative staff members, an editor-in-chief, editors, and peer reviewers, respectively, by modules 106, 107, 108, 109, and 110. System 100 may be further customized to the requirements of the specific publisher, providing a consistent submission method for easier review and publication. The author uses the author module 106 to prepare the forms and written materials, transmitting the completed manuscript over the Internet, to database 101. Once in the database 101, as is better illustrated in FIG. 2, the manuscript is not only available for peer review and a determination whether to accept the submission as presented or request revisions, but also the manuscript can be edited and published in any number of formats.

The manuscript may be sent, for example, from the database 101 to a web server 201 over the Internet 202 to publish an HTML document 203 in the form of a web page. Likewise, it may be sent from database 101 through any conventional typesetting printer (diagrammatically shown as a laser printer 204 in FIG. 2) to publish a hard copy document 205. The document may also be sent from database 101 through a CD-ROM writer 206 to produce a CD-ROM 207. In a presently preferred embodiment, electronic sign-off or approval enables the submitting author to approve the submission after viewing its HTML proof. It should be understood at this juncture, however, that the originally manuscript may be uploaded to the system in ASCII format or in the format of the source document (e.g., RTF, PDF, PostScript formats).

Figure 3:
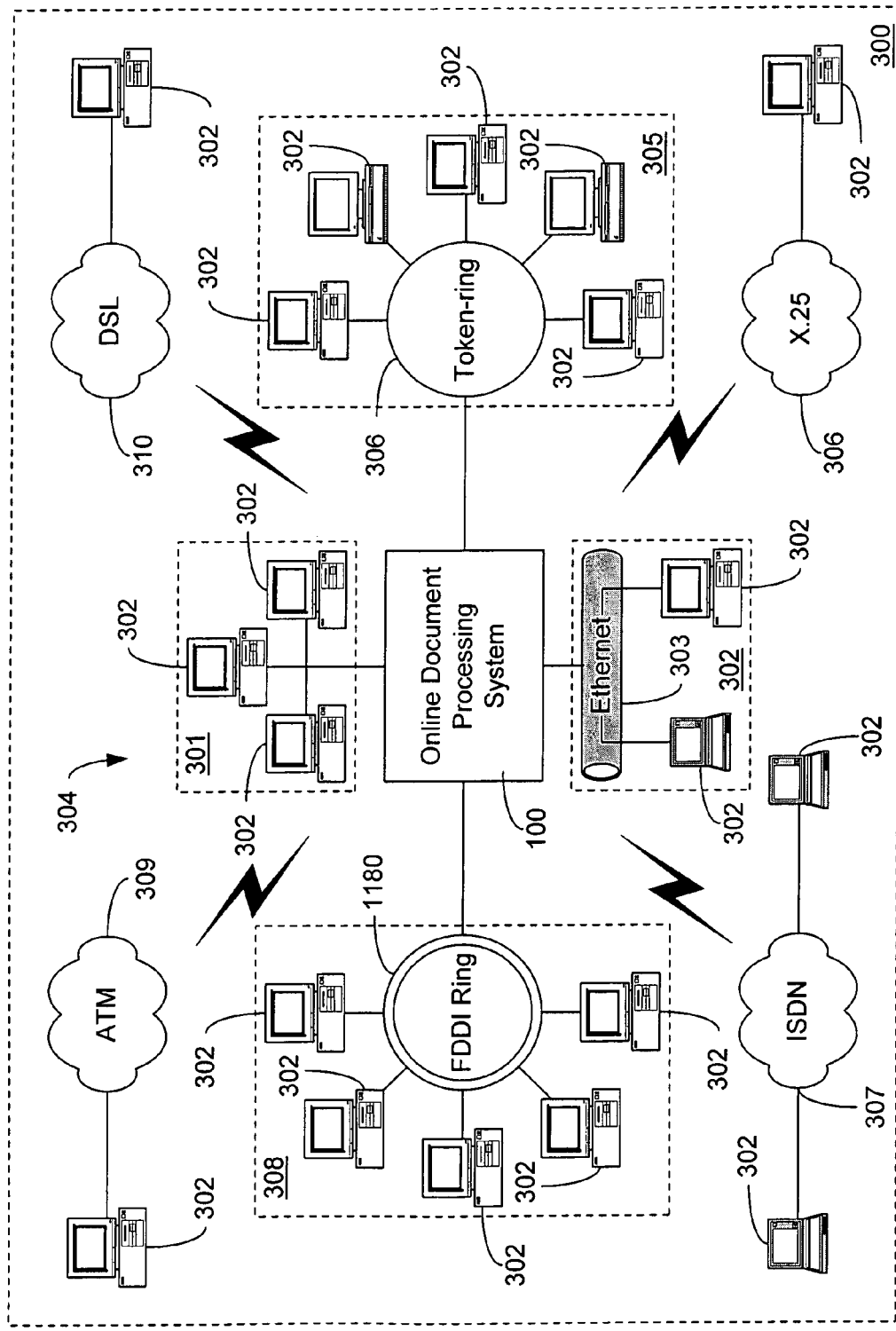
FIG. 3 is a block diagram of a publishing system according to the present invention.

A publishing system 100 according to the present invention is not necessarily limited to the Internet. As shown in FIG. 3, publishing system 300 includes the online document processing system 100, and a plurality of networked computer clients 302. Conventional Ethernet networks 304, such as the network coupling a pair of clients 302 through an Ethernet bus 303, or the star network 301 coupling a plurality of clients 302, may be used to connect the clients 302 to system 300. Likewise, higher speed Ethernet networks, such as network 305 using a token ring 306 may connect the clients 302 to system 100. Even higher speed networks, such as the ISDN network 307, network 308 using an FDDI ring 309, an ATM network 310, and a DSL network 311 may be used. Conventional X.25 type networks 312 are accommodated as well.

Upon completion of data entry, the manuscript is transmitted and the author is presented with the publisher to author query sub-module that has been designed to the specific submission requirements of the publisher. These would include whether the author will be presenting, or has presented, the data at a meeting; whether this manuscript has been published elsewhere; whether this manuscript is only one piece of a larger project, etc. Once the author has answered, and submitted, these queries, the system takes the typed manuscript and converts it into an HTML format for proofing by the author. Once the author transmits the answers to the publisher's queries, the HTML proof is generated and brought onto the screen in the proofing sub-module. Alternatively, the author can transmit the manuscript to the system server prior to completion of the publisher to author query page. The proofing screen is automatically provided with a manuscript number that is used by the author and publisher identify the specific manuscript. A manuscript number is automatically generated by the system using a format that meets with the specific society's requirements. This "on the fly" production of a proof, conversion of ASCII data into HTML and its subsequent display is unique to the system.

The conversion is through the use of a database (e.g., SQL) that permits the user to write a specific application that is driven by the database. The use of custom programmed calculation fields enables the program to convert from the ASCII into the HTML language. The system takes each field of the data sent in ASCII, and applies the appropriate formulas embedded within the program relating to that specific field. An interfacing program (e.g., Lasso, CDML, or SQL) is programmed to recognize the specific coding used with the disclosed systems and enables communication between the web and the database. In this embodiment, all data is saved on the server in ASCII and converted, as needed, into the formats required for the individual application. The language used for saving the data is dependent upon the base program and can be changed in accordance with the program. For example, manuscripts which have been submitted in their native format (e.g., PostScript and PDF, but more preferably RTF) are saved to the database in that format for use in typesetting/page layout.

In the event the author requires the submission of a table within the manuscript (i.e., when the manuscript is uploaded in ASCII format), the disclosed system provides a unique table builder. A table builder button is provided which, when activated, prompts the author for the designated number of rows and columns. Once provided with the parameters, the system builds a blank table consisting of empty data fields. The author enters, or copies and pastes the data into the blank table field by field. The special palette enables the author to include symbols into the table. Once the author has indicated completion of the table, the system displays an instantaneous HTML proof of the table. The table is also incorporated as part of the HTML proof. Although for the submission of manuscripts the location of the table is generally predetermined by the society, a drag and place feature can be incorporated in some embodiments to enable the author to reposition the table. The system also supports multiple tables within each submission.

A further addition to some manuscripts is the inclusion of graphics. The system disclosed herein accepts graphics (e.g., graphs, photographs, multimedia files, data feeds, and streaming video) that are uploaded by the author in a format compatible with the core system. Acceptable format(s), such as JPEG at 72 dots per inch, can be indicated by the system. In computer systems that accept graphics, the submitting author can have a screen where he would be instructed to "browse" his computer for the graphics associated with the submission and transmit the designated files to the system server. The graphics are included in the final HTML proof. As with the tables discussed above, system 300 supports multiple graphic images that can be placed around and/or within the text. The drag and place feature can also be incorporated with the graphics feature. Graphics can also be combined with the table(s) to enable an author to provide graphic explanation of a photograph.

All of the data submitted by the author is placed, at the time of entry, into data fields. Each of these entry fields are tied to hidden calculation fields within the background program that are specifically programmed to instruct the currently running program what to do with the data contained within the entry field. Some of these calculation fields are used to tag the data within the entry field for output to various media. The media can include reading by a web browser, a page layout system or prepared for CD-ROM software or any other media or medium applicable for the final application. The tags in the calculation fields are specially programmed to meet the output specifications of the society or publisher. Thus, if a society is presenting a seminar and providing a hard copy accompaniment, but no CD-ROM, the web browser and page layout tags in the appropriate calculation field would be programmed but not the CD-ROM calculation field. The entry data may be received and stored in ASCII, the tags, however, determine the appearance of the data when it leaves the system. Within these tags would be the font size and style, margins, spacing, etc., to enable the finished product to automatically adhere to predetermined society formats. When manuscripts are uploaded in RTF format, however, all of the font size and style, margins, spacing, etc., is preserved.

An approval choice is also provided, enabling the author to indicate that the HTML proof is either "Approved" or "Not Approved". In the event the author has changes to make on the proof, the system provides the ability to edit the text online through an edit sub-module. Once the author is ready to submit the manuscript, the transmit, or approval, button is "pressed", activating a transmission sub-module to send and store the manuscript to the service provider's database. The author has now completed all of the requirements for the submission of the manuscript and exits the system. In a presently preferred embodiment of this invention, database 101 comprises an SQL-type database. System 300 also preferably uses conventional PHP software to quickly convert and display input and stored information "on the fly" in HTML format.

User Groups

There are several types of user groups according to the present invention. Authors are responsible for submission of manuscripts, including all the supporting data around them. Such supporting data may include: (a) contact information for the corresponding author (e.g., name, address, department, institution, phone, fax, e-mail); (b) list of contributing authors and their institutions, including all the supporting data around them to a level specified by the publisher; (c) specification of any color figures, manuscript types and descriptors, and key words; title, manuscript, and suggested or non-preferred reviewers/editors and their contact information, and a cover letter; and (d) mandatory fees and forms. The rules of electronic submission are followed with electronic submission, so the manuscript can be reviewed on system 100. Authors are also responsible not only for proofing their electronic submissions, and but also using technical support as necessary to complete submission.

Editors-in-Chief (EIC) receive each newly submitted manuscript, once it has been cleared and passed along by the administrative center, and can accept or reject it at that time. Typically, the manuscript is assigned to an Associate (or Review) Editor for reviewer assignments and subsequent peer review. The EIC is also charged with overall management of this review process, including the monitoring of each Editor and their turnaround time (i.e., time from assignment to decision), and making recommendations for special topics or specific manuscripts. The EIC utilizes a searchable database for selecting Editors, noting their displayed workloads, specialties, and histories before making a selection and assigning via e-mail. With some publishers, the final decision on each manuscript will come through the EIC for approval. Reports on turnaround time, types, origins, and numbers of manuscripts submitted, and reviewer and editor performance is analyzed by the EIC.

Associate(or Review) Editors (AE) manage each manuscript's peer review process. After assignment to a manuscript by the EIC, the AE then selects reviewers using a searchable database and noting each reviewer's workload, specialties, and turnaround time when making these assignments. The assignments are first invited by way of e-mail. Once agreement to review has been obtained, the reviewers are notified by e-mail and access granted to the manuscript.

After the reviews are in, the AE is then charged with making the decision on the manuscript, using their decision options. An e-mail of decision is generated, edited appropriately by the AE, and sent to the author, again by way of e-mail or traditional mail, to complete the process. If the decision is to revise, the revised manuscript may bypass the administrative and EIC centers and returns directly to the AE for processing.

Reviewers (or referees) are invited by e-mail and assigned to review manuscripts online. They fill out a score sheet and comments on the manuscript, recommending a decision, and will check point-by-point author responses in revised manuscripts submitted by authors for compliance/rebuttal.

The administrative staff is charged with processing all manuscripts that are submitted for completeness, mandatory fees and forms, other requirements, and correct data. When cleared, the administrative staff moves the manuscript to the EIC for assignment. The administrative staff is also in charge of maintaining/updating the user database, organizing all reports and user access, providing user support and information, creating new user data and log-in information when necessary, adjusting and maintaining the correspondence listings, manuscript numbering and withdrawals, contacting delinquent authors and reviewers, and communicating issues with the service provider. The administrative staff requires universal access to all centers and information.

The Board of Editors (BOE) is the governing body of editors that approves or recommends changes to decisions made by individual Associate Editors. The BOE provides the final link in the decision process, formalizing all decisions, and sending out the decision correspondence. Utilizing the BOE is a publisher preference, and other publishers may use their EIC in the same manner. Many publishers, however, leave the decision to the EIC or the managing AE that is assigned the manuscript.

Access

Figure 4:
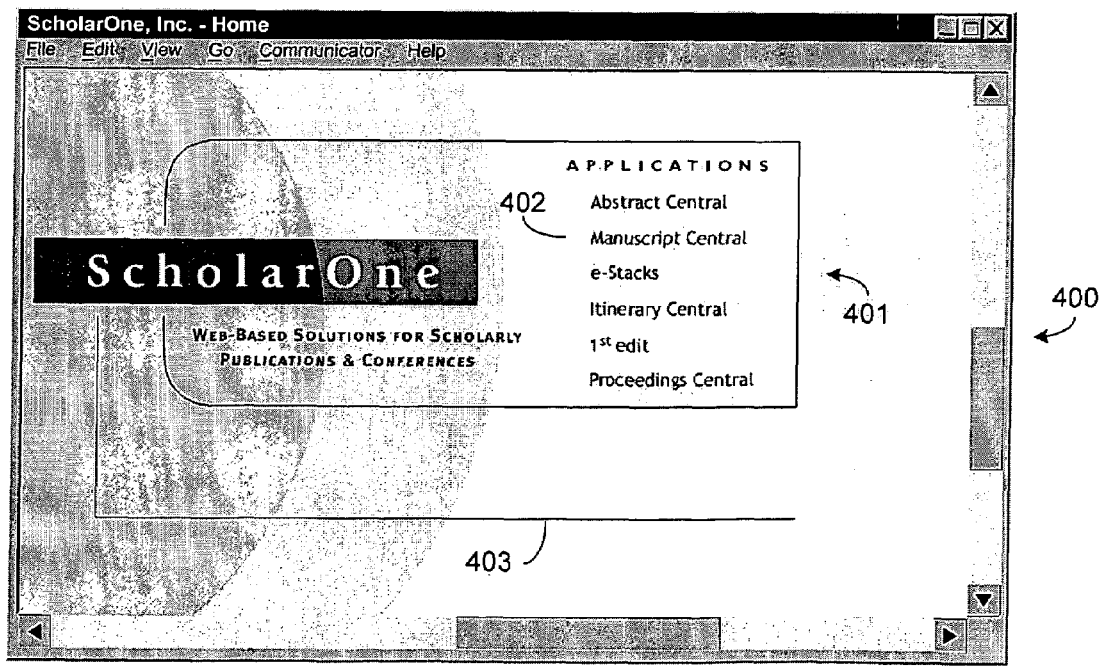
FIG. 4 illustrates a web page, which provides a portal means for gaining entry to the online document processing and publishing systems of the present invention.
Figure 5:
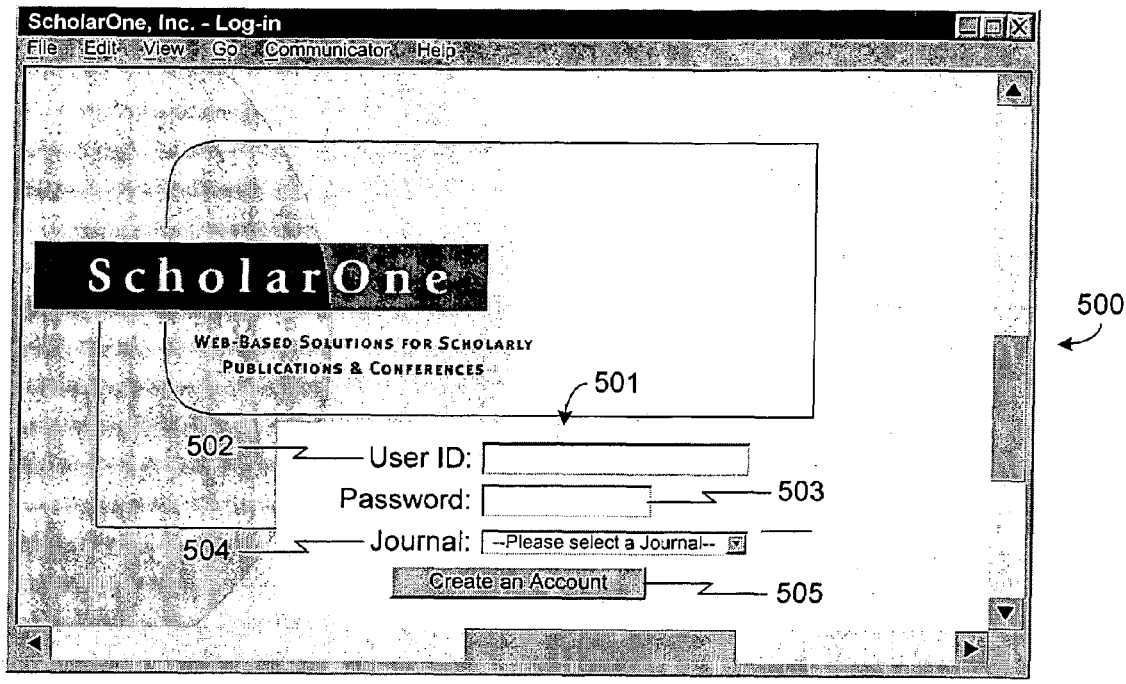
FIG. 5 is a web page, which provides a means for client log-in as shown in FIG. 4.

Authors preferably have a link on a log-in screen 500 (FIG. 5) to "Instructions for Authors," which may be created through collaboration between the publisher and the service provider. This is because each author must have easy access to submission requirements before beginning the process. An illustrative web page 400 of the service provider is shown in FIG. 4. Users are also given access to a plurality of applications 401, only one 402 of which may be related to the submission, review, and approval of manuscripts according to the present invention. The user conveniently selects a hyperlink 403 in order to log-in.

Figure 6:
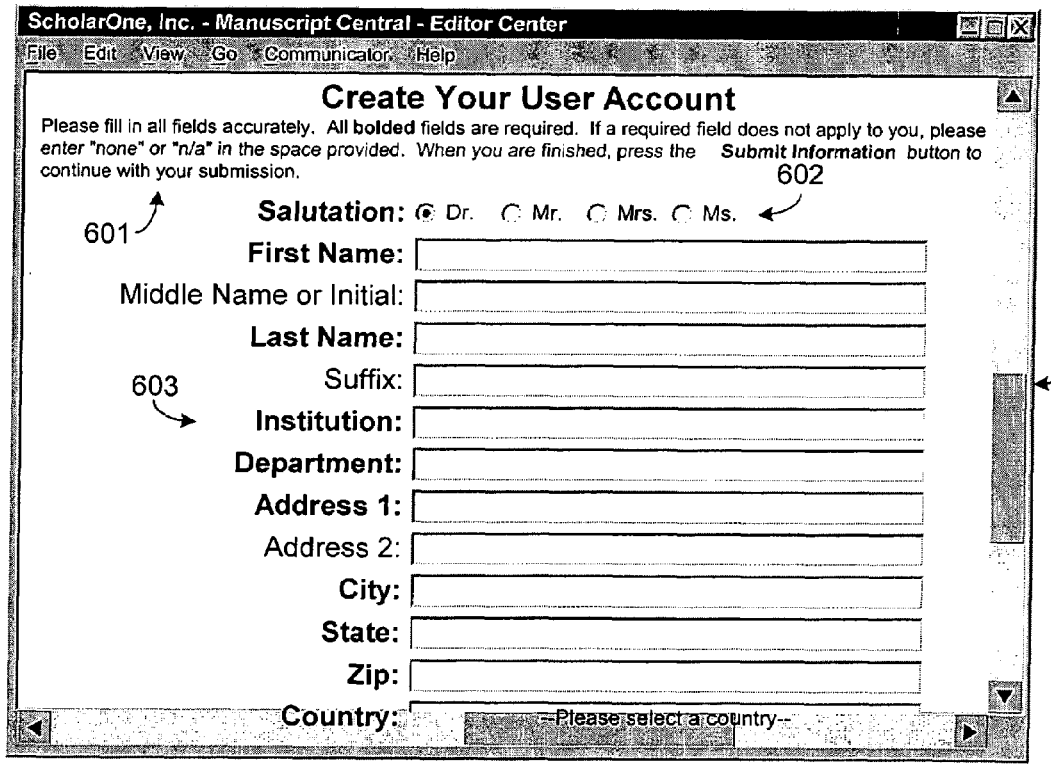
FIG. 6 illustrates a web page, which provides a means for creating a user account according to the present invention.
Figure 7:
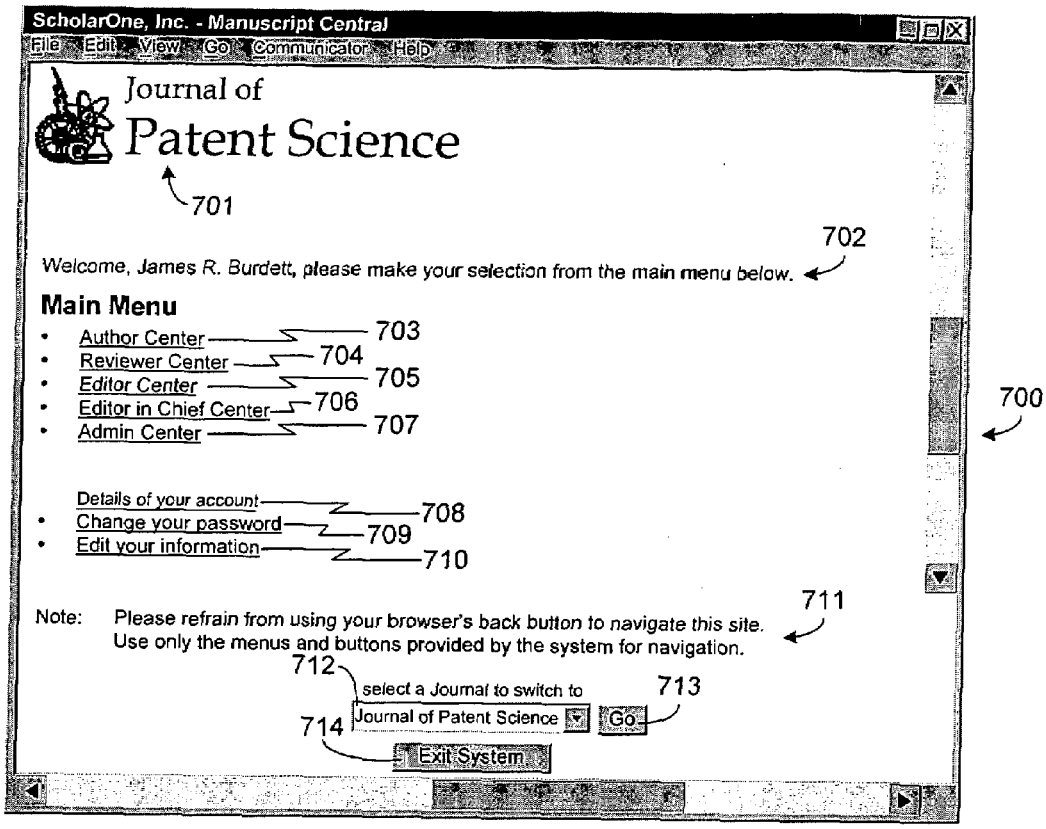
FIG. 7 is a web page, which provides a means for selecting among a plurality of user modules.

Once the hyperlink 403 is selected, the user is taken to log-in screen 500 to input various required data 501. Such data 501 will typically include a user identification or ID 502, a password 503, and a means to select the appropriate journal 504. Users with no account are permitted to create one. Accordingly, means 505 is also provided at the log-in screen 500 to create an account. Account creation, as shown in FIG. 6, may require certain fields 603 selected by the publisher to be validated, such as phone number and e-mail address. The user may also be prompted to select the user ID 502 and password 503, with the latter being preferably double entered for validation. The ability to edit the user profile and change a password are also available from the main menu as shown in FIG. 7. Means to use e-mail to request password information should accompany the log-in process. Any user is allowed to create their account for submission, editorial, or administrative purposes within the system. The account and password is editable by the user, and if information required, an outlet for gaining that information supplied.

In the system 100 according to the present invention, users have the ability to check for existing accounts via e-mail communication with technical support. Users need a mechanism to retrieve account information, and to help prevent duplicate accounts in the system. Moreover, users are allowed to select the specific publication to which they have access (if they have access to multiple publications) and to which they wish to submit, view, or act on a submitted manuscript. This is provided, in part, by the means 712 shown in FIG. 7.

For example, a plurality of collaborating authors may access a draft manuscript from the manuscript center and agree on the final draft which will be submitted for review.

Figure 8:
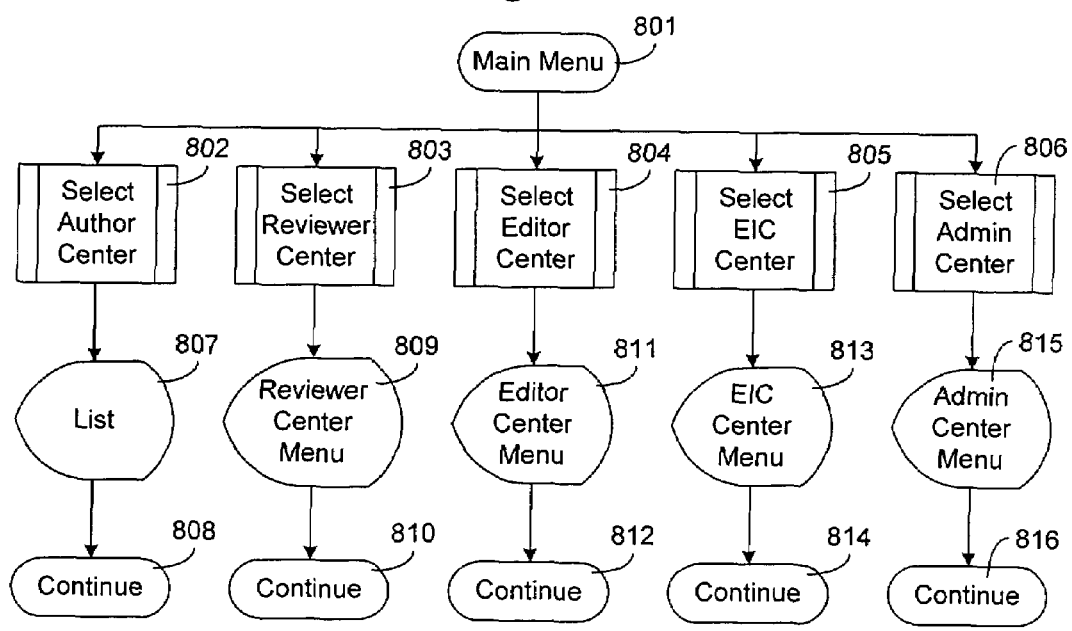
FIG. 8 illustrates a simplified flow diagram, which generally demonstrates accessing means for selecting among the plurality of user modules shown in FIGS. 1 and 7.

Likewise, users have the ability to pick from the main menu 700 the appropriate center 703, 704, 705, 706, 707 for which they have access. Any given user may fulfill more than one role in the system. Accordingly, depending on their access privileges, users are able to select the center they need to work in from the main menu 700. The basic method of accessing each center is shown in FIG. 8.

For example, a user first goes to the main menu 700 at step 801. The user may then select the desired center by selecting (or "clicking on") any one of the hyperlinks shown in FIG. 7 (i.e., Author Center 703, Reviewer Center 704, Editor Center 705, Editor in Chief Center 706, or Admin Center 707). This is done, respectively, at steps 802, 803, 804, 805, or 806. Once selected, the selected center is displayed at steps 807, 809, 811, 813, or 815, respectively. The user respectively continues the process at steps 808, 810, 812, 814, or 816.

Author Module

Authors in the system 100 according to the present invention have the ability to upload files types designated by the client. Such file types include Rich Text Format (i.e., "RTF") documents, PDF files, and PostScript files. These files will be uploaded to location specific to the journal for which they are submitting a manuscript. Rich Text Format documents are a generic format in which authors is able to save their manuscripts from most word-processing programs. PDF and PostScript files (which are converted to PDF files for proofing) are also generally accepted as common file types to most authors.

Figure 9:
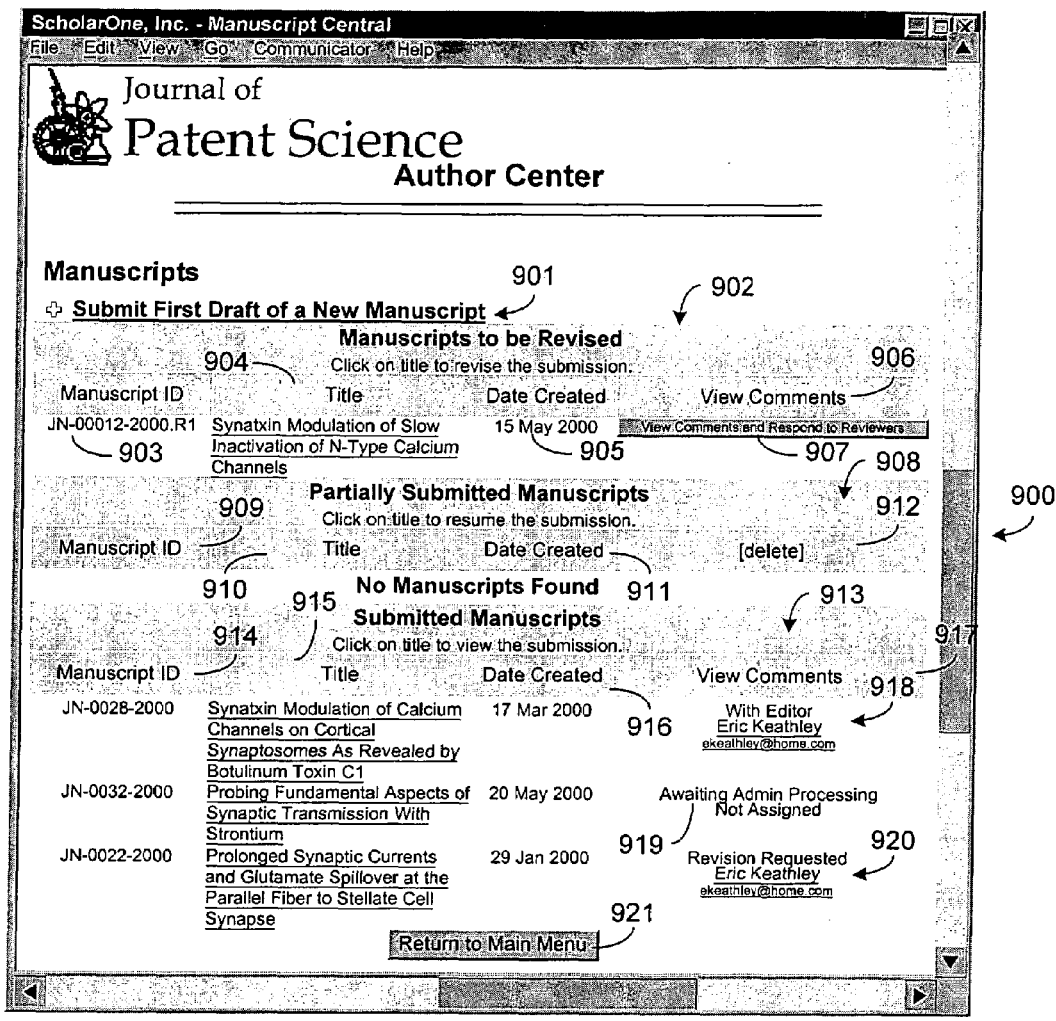
FIG. 9 is a web page, which provides a means for accessing the author module shown in FIGS. 1 and 7.

Referring for the moment to FIG. 9, it can be seen that authors have the ability to enter any information about the manuscript they are submitting by way of an Author Center window 900. This information includes the manuscript type, the contributing authors and their institutions, the Title, the Manuscript, and its Key Words, although other information may be added. Navigation between these screens is also available, and once data is entered, it is saved automatically. This descriptive information can be reused in summary display windows, for system users to search on manuscripts based on this information, and in e-mails for determining prospective reviewers for the manuscript. Authors also are able to return to screens to make corrections, and any data will be deposited to the database upon entry.

A mid-information entry option 921 to return to the main menu 700 is available for easy exit at any time. This is because authors need the ability to exit the data entry process at any time, and to understand what information has been entered successfully up until that point of exit.

Authors are also able to compose a cover letter utilizing client customized fields for recommending or advising against reviewers and editors, and for comments to the Editor-in-Chief. A cover letter typically accompanies a manuscript submission, and the extra information can both add to the reviewer pool and prevent bias during peer review.

Preferably, a draft center is provided for completing and proofing the upload process and its results. Authors will, thus, upload their documents and, if using Rich Text Format, their image files in this subset of the Author center. Image files are uploaded separately if using Rich Text Format, and many files types are accepted, as are links to other sites, HTML files, and other document file types. PDF or PostScript files will have the images embedded in one file. Authors need an area to complete their manuscript submission and proof the results before formally submitting. The "Instructions for Authors" will determine their method of upload.

Authors have the ability to contact support or submit by other means (mail or "fax-to-web") if they encounter difficulties. They are able to communicate to technical support via e-mail to express specific issues with their submissions. Authors need the ability to complete their submission without undue effort. Support and alternative submission options will ease their effort.

Authors are provided their official manuscript number upon submission and access to any mandatory forms for completion. A confirming e-mail is also sent to the corresponding author and any co-authors whose e-mail addresses have been provided. The client's administrative center will also be alerted by e-mail of each new submission. The author needs their manuscript ID number to track the progress of the manuscript, and the forms to make sure the manuscript is processed. These forms may include a payment form, if the client charges for submission. The confirming e-mails follow up the onscreen confirmation, and alert the client's administrative staff that a new submission is ready for processing.

The author center is preferably separated into three sections: (1) Manuscripts to be Revised, which appears only when a manuscript has been decided as needing revision before possible acceptance, and adds an appropriate designation such as RI to the manuscript ID; (2) Partially Submitted Manuscripts, which are manuscripts being worked on but not submitted; and (3) Submitted Manuscripts, where formally submitted manuscripts are updated as they move through the peer review process. Once a manuscript has been submitted, however, the submitting author loses his/her permission to and cannot access that submitted manuscript; a new manuscript must be submitted if revisions are to be made. Manuscript revisions are accompanied by a link to the original decision letter, which includes editor and reviewer(s) comments, and forms to reply to both sets of comments that are transmitted to the editor and reviewers to consult during the next round or review. Authors need the ability to track their manuscripts after submission and to keep track of manuscripts they are working on. For revisions, the author can bypass the descriptive information associated with the manuscript and move right to the Draft center for upload.

How authors use the system 300 of the present invention will now be described by reference to FIGS. 10(*a*), 10(*b*), and 10(*c*). At the outset, the author accesses the system 300, logs-in, and goes to the main menu 700 at step 1001. He/she then selects the Author Center at step 1002, after which a list of manuscripts is displayed at step 1003 and as shown in FIG. 9. If the author is submitting his/her first manuscript, the system 300 prompts the author at step 1004. The author then selects the "Submit First Draft of a New Manuscript" hyperlink 901, and enters the manuscript type. The system 300 then prompts the author at step 1007 with the question whether the manuscript includes any color illustrations. If so, the author then checks a radio button (not shown) to so indicate at step 1008.

If there are other contributing authors, the system 300 prompts the author to answer that question at step 1010. If so, the system 300 then prompts the author to enter the name of such other author(s) at step 1011. The system 300 then prompts the author with the question whether the name of the author's affiliated institution has been entered at step 1009. This process continues in a loop until all author's names and the names of their affiliated institutions have been entered. In the event that there are no color illustrations and no contributing authors, the system 300 prompts the author to go to step 1009 directly.

The system 300 then prompts the author with the question whether a title of the manuscript has been entered at step 1012. If so, the system 300 prompts the author with the question whether an abstract has been entered at step 1014. The system 300, in the event step 1014 was answered in the affirmative, then prompts the author with the question whether keywords have been entered at step 1016. In each of the preceding three questions if the answer is no, the author is prompted to take the action at steps 1015, 107, and 1019, respectively, and the process continues.

The system 300 then prompts the author with the question whether he/she has any suggested peer reviewers at step 1018. If not, the process continues at step 1021 (FIG. 10(*b*)). If so, the system 300 prompts the author to enter the names of those suggested reviewers at step 1020, and the process continues at step 1021 (FIG. 10(*b*)). If the author is not submitting a first draft, he/she is prompted with the question whether he/she would want to view another draft at step 1006. If not, the system 300 redirects the author to the main menu 700. Otherwise, the process continues at step 1036 (FIG. 10(*b*)).

The system 300 then prompts the author with the question, at step 1021, whether he/she has any peer reviewers who are not preferred. If so, the author is prompted to enter the names of the non-preferred reviewers at step 1022. If not, or after the author has entered those names, the system 300 then prompts the author with the question whether he/she wants to send any comments to the editor-in-chief. This is done so at step 1023. If the answer is yes, the system 300 prompts the author to enter those comments at step 1024. Otherwise, or after such comments have been entered, the system 300 sends the author to the draft center at step 1025.

Once in the draft center, the system 300 prompts the author with the question whether he/she wants to upload his/her manuscript at step 1026. If so, the system 300 then uploads the manuscript at step 1027. Otherwise, the system prompts the author with the question whether he/she has any changes to make to the manuscript at step 1028. If not, the system 300 uploads the manuscript. Otherwise, the system 300 provides for forward and back options at step 1029 such that the author may make those changes or upload the manuscript only when it is deemed ready.

While the manuscript is being uploaded, the system 300 performs error checking at step 1030. The system 300 continually determines whether the error check has been completed at step 1031, looping back to the check as appropriate. Once the check has been completed, an HTML proof is displayed at step 1032. This display may also be reached by selecting the manuscript title at step 1036 after an affirmative response to the query of step 1006 (FIG.

10(*a*)). The system 300 then prompts the author at step 1033 with the question whether to submit the manuscript as shown in the proof. If not, the system 300 returns the author to the main menu 700. However, if the author does want to submit the manuscript at this stage, he/she may do so by clicking the "submit" button (not shown) on the proof at step 1034. A confirmation window is displayed at step 1035 and the system 300 returns the author to the log-in screen 500.

Figure 10C:
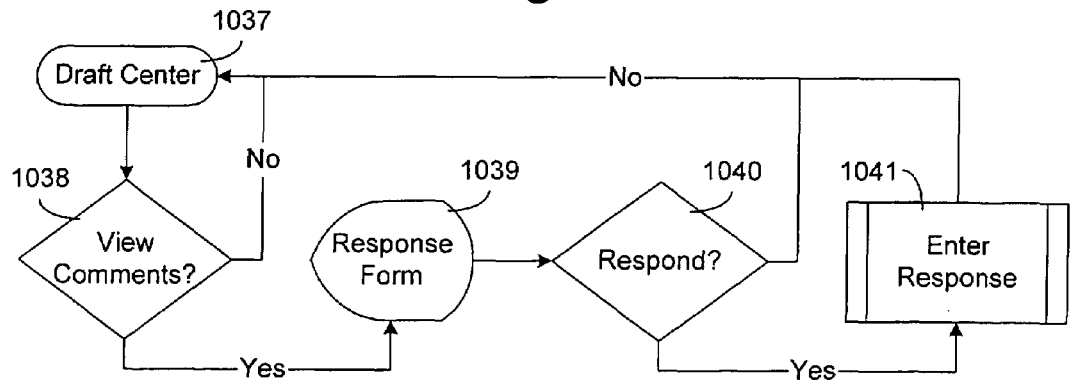
FIGS. 10(a), 10(b), and 10(c) illustrate in further detail a flowchart, which implements the author module shown in FIGS. 1 and 7.
Figure 10A:
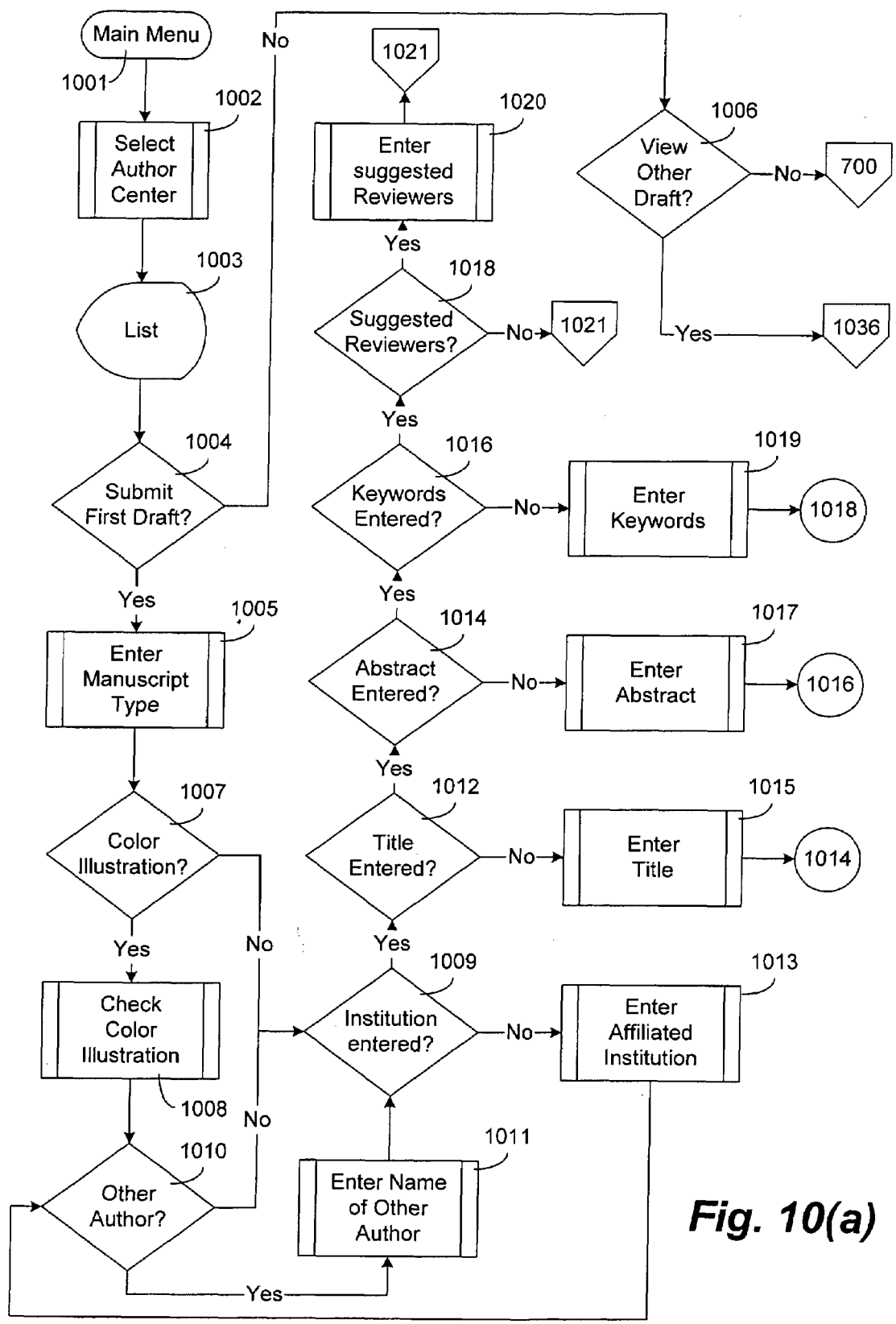
Figure 10B:
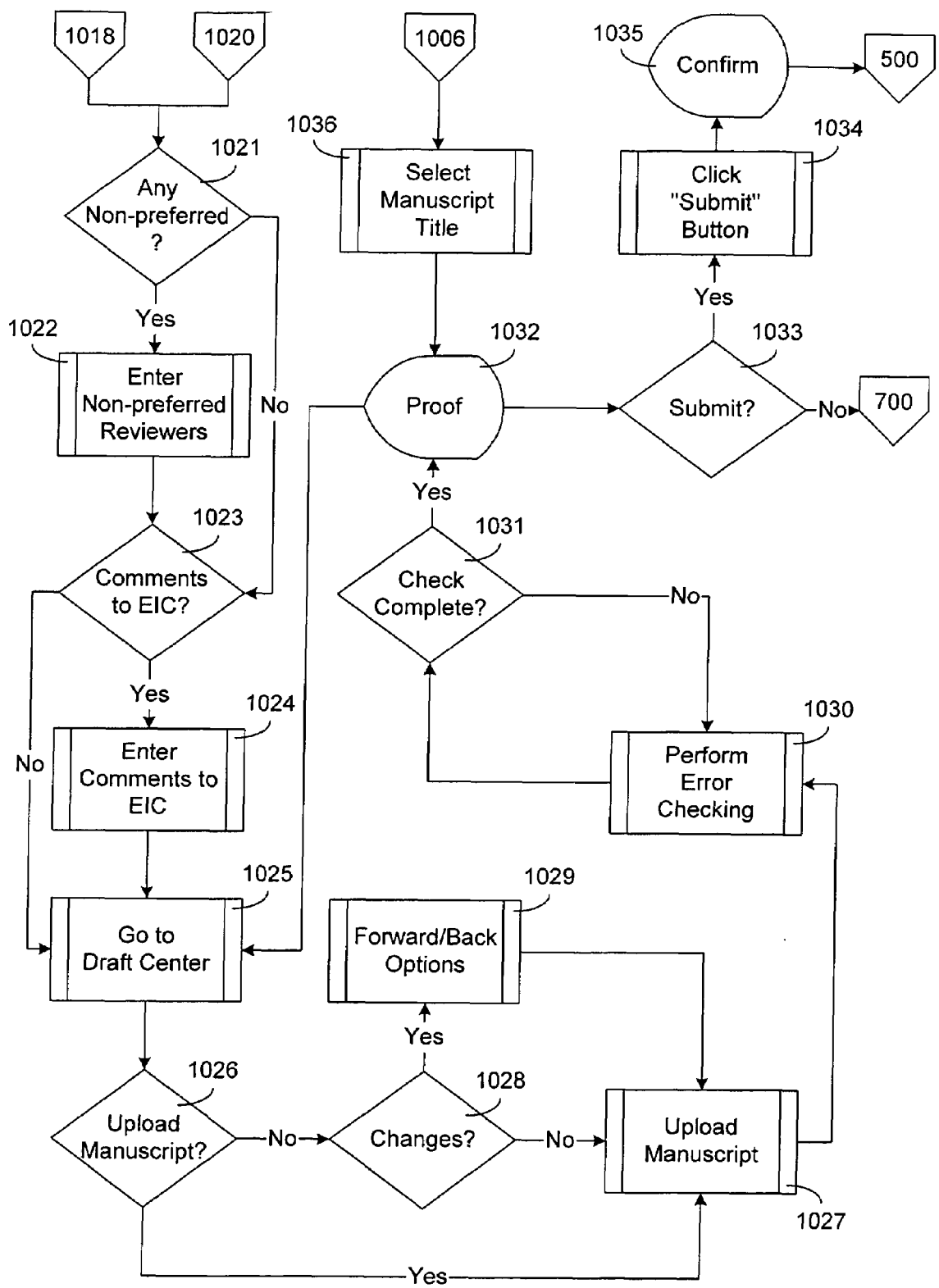

As shown in FIG. 10(*c*), the author may view comments regarding submitted manuscripts from the draft center 1037. There, the system 300 prompts the author with the question whether he/she wants to view the comments of his/her peer reviewers at step 1038. If not, the system 300 returns the author to the draft center 1037. Otherwise, the system 300 displays a response form at step 1039. The system 300 then prompts the author with the question whether he/she would want to respond to the comments of his/her peer reviewers at step 1040. If not, the system 300 returns the author to the draft center 1037. Otherwise, the author enters his/her response at step 1041, and upon completion, returns to the draft center 1037.

Administrator Module

The client's administrative staff have complete and immediate access to all newly submitted manuscripts from their administrative center Menu. Access includes not only the descriptive information submitted with the manuscript, but also the date submitted and access to the manuscript itself in electronic form. A checklist of items is completed before the manuscript is moved along for assignment. The role of the administrative staff is to ensure each submission has all the necessary elements completed and submitted before it moving into the peer review process. This includes checking the manuscript for completeness and noting that any mandatory fee and/or submission form has been received.

The administrative staff have the ability to move new manuscript submissions on to the Editor-in-Chief for peer review assignments. E-mail is sent to the Editor-in-Chief when a new submission has entered his or her center for assignment. Once it is determined that a manuscript is ready for peer review, the administrative staff will initiate this process by opening access to the manuscript to the Editor-in-Chief. The accompanying e-mail prompts the Editor-in-Chief that a new manuscript awaits action.

The administrative staff have access to all manuscripts and manuscript histories through a multi-field search function in the administrative center. The history should include but not be limited to the following: all of the steps of the peer review process and their dates of completion, all comments and reviews associated with the manuscript, all descriptive information about the manuscript, its peer review team and associated dates of response and assignment, and any correspondence associated with the manuscript. In order to support users and assist in the management of the peer review process, the ability to search for any manuscript and display its history is vital to the success of the system and the communication with its users.

The administrative staff have numerous reports and listings available via links in the Administrative Menu and in the Reports Menu. The reports and listings can be customized per client, but several standard items are included with the system. All listings should include manuscript ID number, corresponding and contributing authors, institutions of the corresponding author, the Associate (or Review) Editor (when assigned), and the current manuscript status. Most of these fields can be sorted, and each listing is typically broken into sets of ten that can be navigated with Next and Previous buttons. Samples of listings include but are not limited to manuscripts with Editor-in-Chief and with Associate (or Review) Editors, accepted and rejected manuscripts and outstanding revisions. Samples of reports include but are not limited to number of manuscripts by type, country, decision, and editor, time from submission to first decision and acceptance, time from Editor-in-Chief to Editor, time from Editor to reviewer, accept/reject ratios, reviewer listings and performance histories, and outstanding reviews.

All reports and listings are vital to the management and subsequent tracking of and periodic reporting on the process of peer review. The sorts and the breakdown of lists into sets of navigable screens will facilitate screen re-drawing and information retrieval.

In the Reports Menu, one report, Outstanding Reviews (non-returned reviews), contains management capabilities including reviewer contact information, a notes field for comments, and an e-mail-sending capability for action. Reviewer management is the most important element of successful peer review. Enabling the administrative staff to assist the editors in facilitating review in a timely fashion is crucial to the success of any peer review system.

The system highlights manuscript numbers for which decisions are overdue in red in the following areas: the Administrative center listings, the Editor-in-Chief listings, the Associate (or Review) Editor listings, and in the Outstanding Reviews report. Management of the review process is vital to the success of any peer review system, and highlighting these overdue items will alert all users of the necessity to instigate action towards decision.

There is a designated area for creating and maintaining all e-mail correspondence utilized in the system. Users have the ability to edit and activate (or deactivate) any correspondence, bringing in the required database fields as necessary to automatically populate the correspondence with the appropriate data. The administrative staff needs to maintain and update all correspondence that will be sent to users. The use of database fields in the correspondence allows for the enhanced utilization of the collected user data.

The administrative staff should set up schedules for automatic, system-sent e-mails and the highlighting of overdue decisions on manuscripts. The automatic reminder e-mails are for reviewers with non-returned reviews and sent on predetermined schedules. The wording of these e-mails is determined in the correspondence section, and any sent e-mails listed in each manuscript's correspondence history. Manuscripts in need of decisions are marked according to predetermined schedules set in the same manner as the automatic e-mails. Reviewer management is the most important element of successful peer review. Automatic reminders will help facilitate this process, and highlighting overdue decisions will instigate appropriate action.

Figure 11:
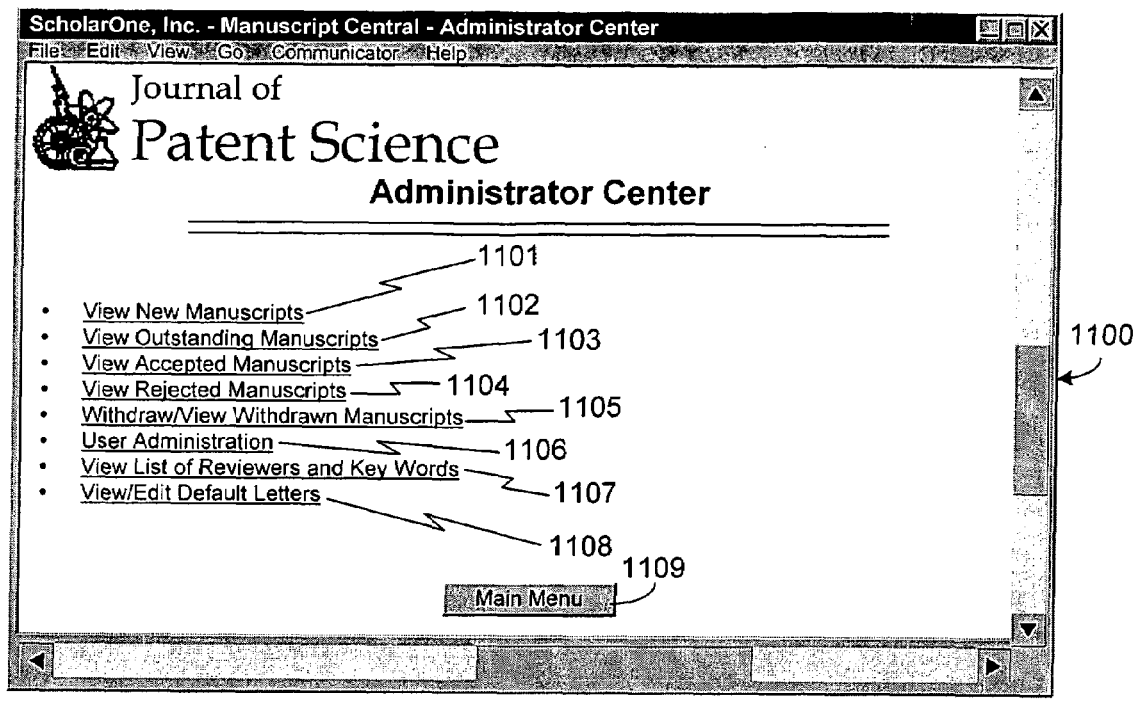
FIG. 11 is a web page, which provides a means for accessing the administrator module shown in FIGS. 1 and 7.

The administrative staff have the ability to add to, maintain, edit, and update the user database and the access of each user through a link in the administrator center menu 1100 shown in FIG. 11. The administrative staff, limiting or opening up access as required, determines access for each user and otherwise keep the database current user IDs and Passwords can be determined in this area as well. The database is searchable by name, key word, and area of expertise.

The administrative staff is charged with keeping the database, which is the backbone of the system, current and accurate. This staff must also determine access rights, which is the central source for all client data and editorial appointments. A searchable database will facilitate its manipulation and information retrieval.

The administrative staff have the ability to send an "account created" e-mail with log-in information to new or established users by clicking a button in the user database. Having the ability to alert new users and remind current users of their log-in information from the user database will facilitate the communication between administrative staff and system users.

Administrative staff have the ability to log-in as any user with a button located in the user database. Administrative staff may fill other roles, such as Associate (or Review) Editor at the outset of system implementation, but more typically this feature is used to complete requested tasks or investigate user issues.

The administrative staff have the ability to more quickly enter the descriptive author data that accompanies a manuscript submission through a link in the administrative center. This option will display all the required fields for manuscript entry in one form, and stop prior to uploading the manuscript. Particularly when a system first opens, the transition to electronic submission typically entails the administrative staff assisting in manuscript submission to a degree that necessitates the facilitated entry of data. As users become accustomed to the system, this feature will be utilized in more time-sensitive situations.

Figure 13:
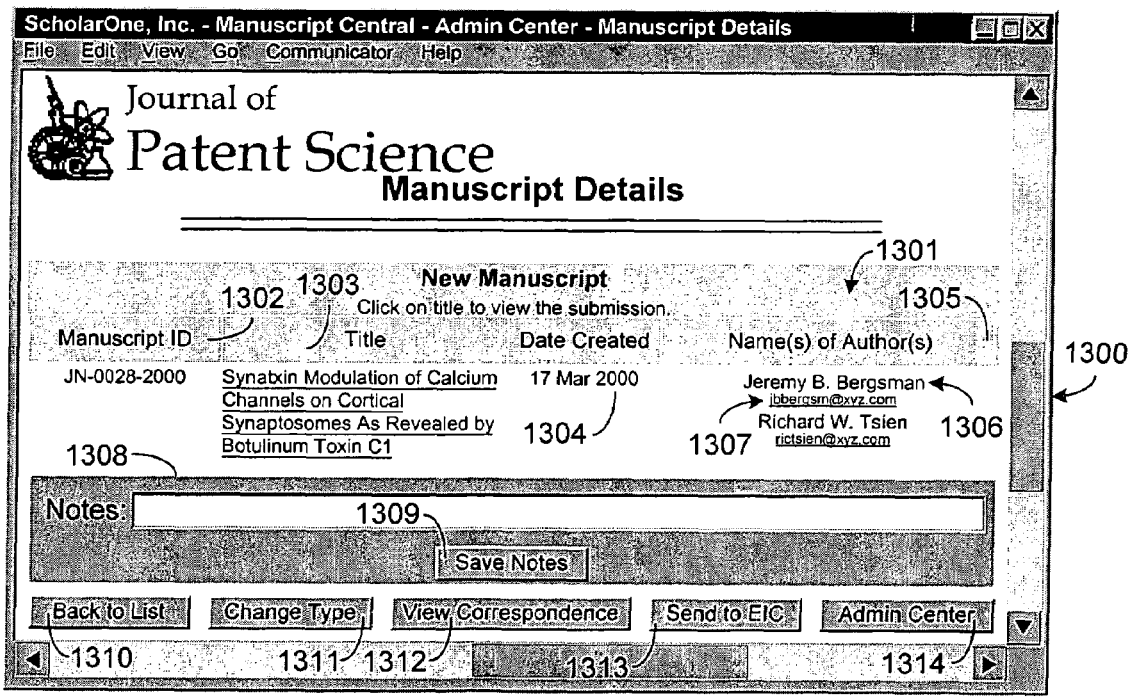
FIG. 13 is a web page, which provides a means for accessing manuscript details according to the methods illustrated in FIGS. 12(a) through 12(i)

Referring now to FIGS. 11 and 13, in conjunction with FIGS. 12(a) through 12(i), methods for accomplishing the foregoing will now be described. At the administrator center menu 1100, there are a plurality of selectable options, which provide the user with the ability to: view new manuscripts 1101; view outstanding manuscripts 1102; view accepted manuscripts 1103; view rejected manuscripts 1104; withdraw/view withdrawn manuscripts 1105; do user administration 1106; view a list of reviewers and key words 1107; and view/edit default letters 1108. The user may also return to the main menu 700 merely by selecting the "Main Menu" button 1109.

Figure 12A:
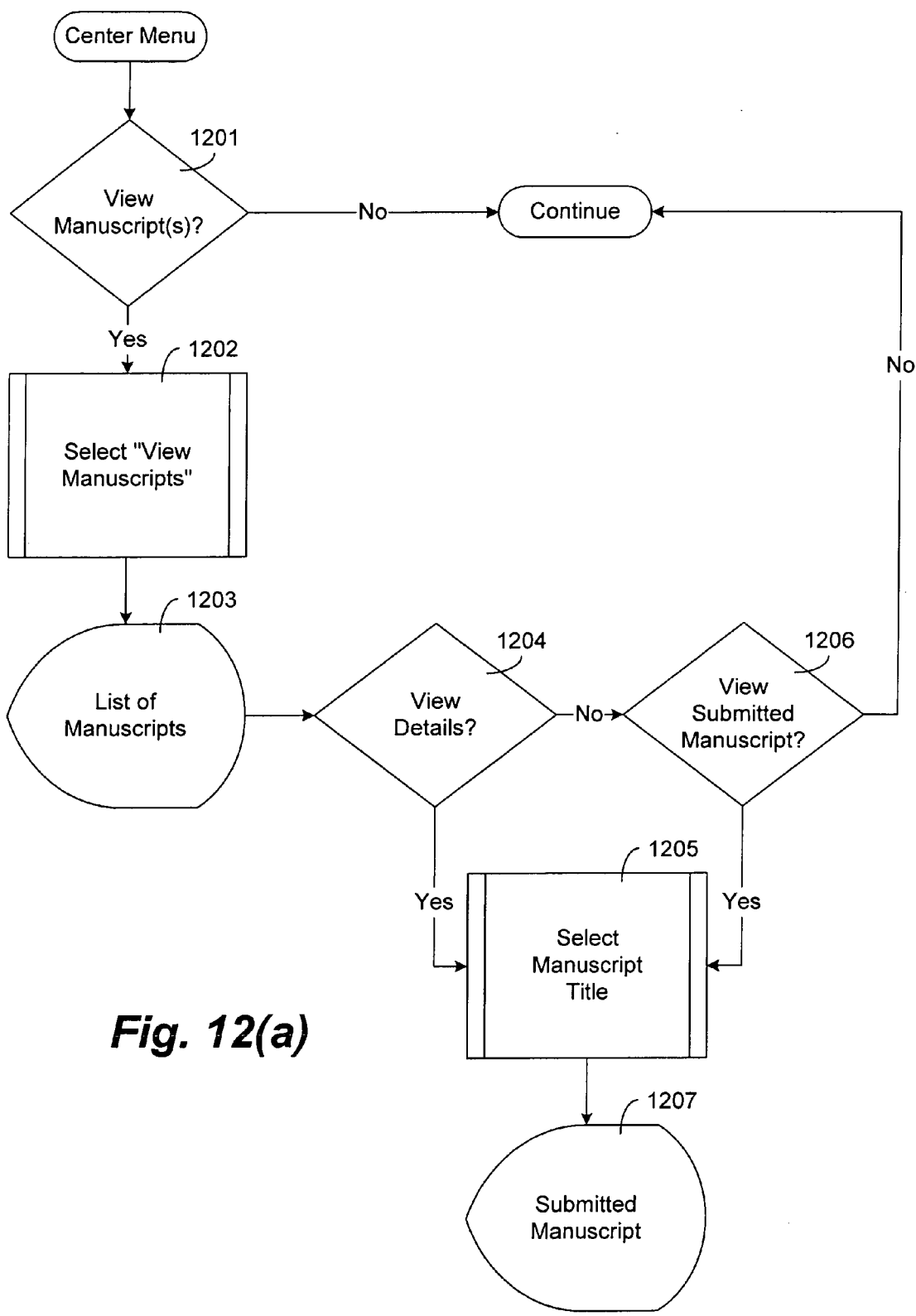
FIG. 12(a) illustrates in general a means for accessing a submitted manuscript.

As shown in FIG. 12(a), a user is first prompted by the system 300 with the question whether the user would want to view manuscripts at step 1201. If not, other options are available. If so, however, the user then selects the appropriate "view manuscripts" hyperlink 1101, 1102, 1103, 1104, or 1105 at step 1202. The system 300 then displays the appropriate list of manuscripts at step 1203. The system 300 then prompts the user with the question whether the user wants to view the details of a manuscript at step 1204. If so, the user must select the manuscript title (e.g., 1303 in FIG. 13) at step 1205, whereupon the selected manuscript proof is displayed at step 1207. Alternatively, the system 300 prompts the user directly with the question whether the user wants to view the manuscript proof at step 1206. If so, the user again selects the manuscript title hyperlink 1303 and the proof is displayed. Otherwise, the user can continue with other options.

Figure 12B:
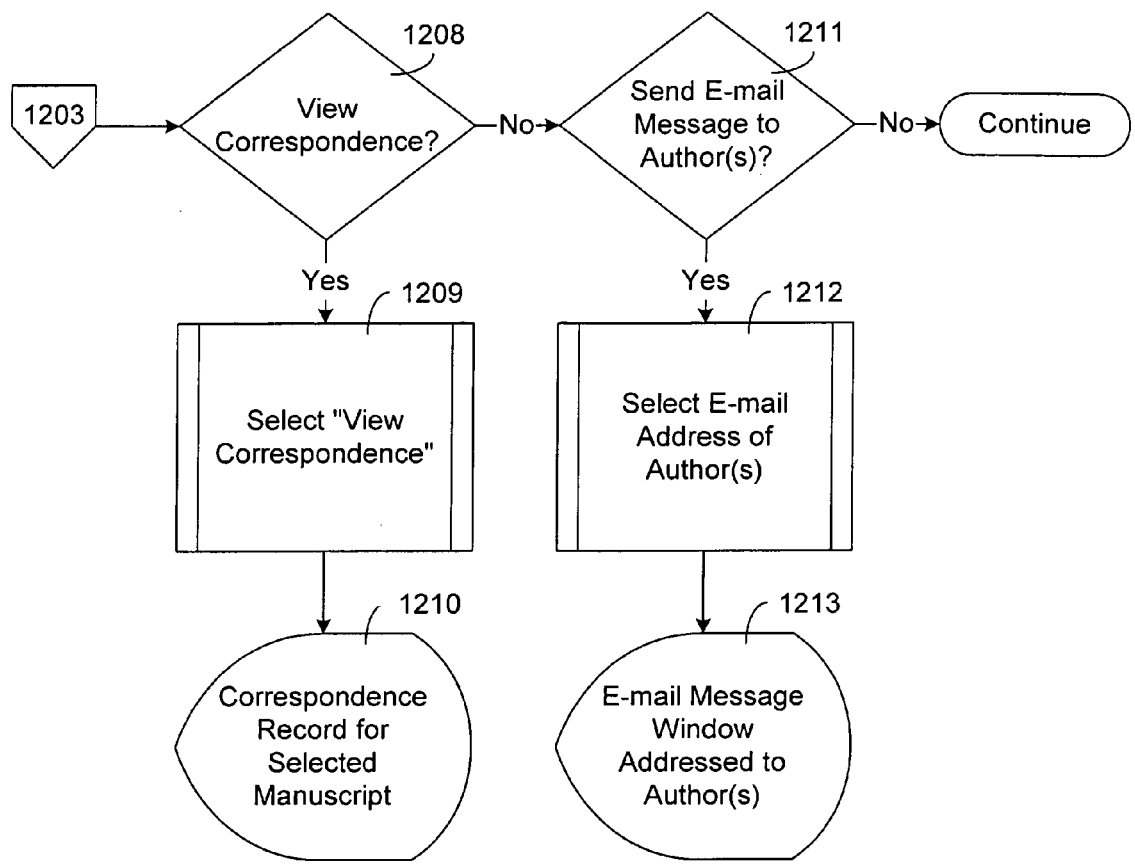
FIG. 12(b) is a flowchart generally illustrating a means for corresponding in accordance with the present invention.
Figure 12C:
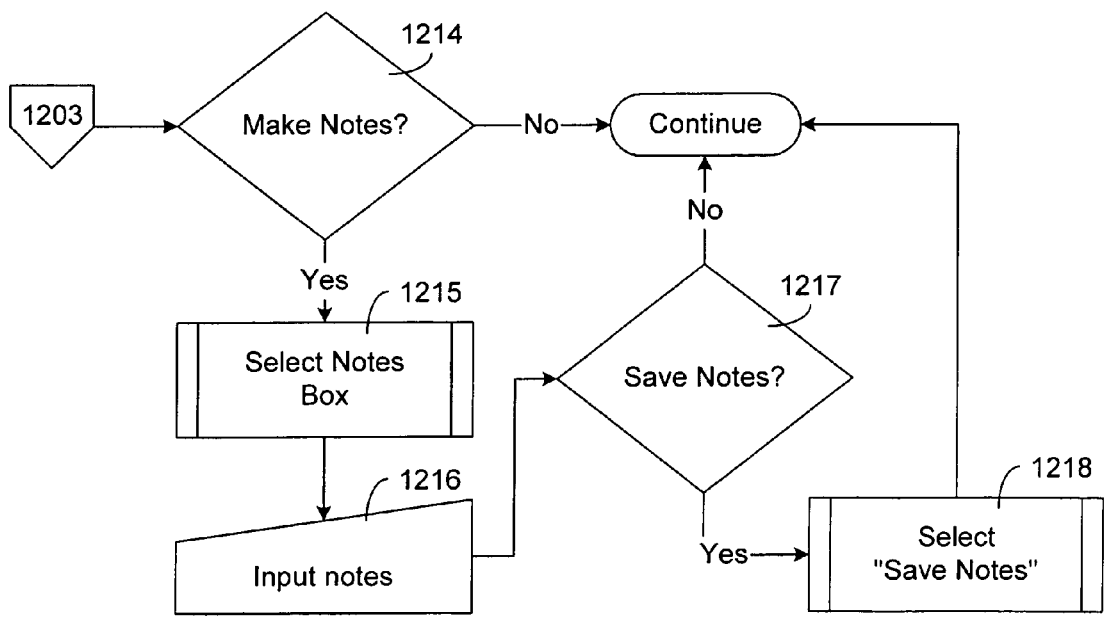
FIG. 12(c) illustrates in general a means for making notes according to the system and methods of the present invention.

For example, and referring now to FIG. 12(b), the system 300 prompts the user with the question whether the user would like to view correspondence at step 1208. If so, the user may select a hyperlink (not shown) to "view correspondence" at step 1209, whereupon a record of the correspondence for the selected manuscript is displayed at step 1210. If not, the system 300 prompts the user with the question whether the user wants to send e-mail messages at step 1211. If not, the user continues with other available options. If so, the user must select the e-mail address of the desired party (e.g., in this case, the author) by clicking on a hyperlink 1307. Then, the system 300 displays an e-mail message window at step 1213.

In the event that the user (e.g., an administrator) wants to make notes, the user answers the prompt at step 1214 in the affirmative by selecting the notes box 1308 at step 1215. The user then inputs the notes at step 1216, and the system prompts the user with the question whether the user wants to save such notes at step 1217. The user then selects "Save Notes" (e.g. by clicking the button 1309), and the system 300 saves the notes to its database 101.

Figure 12D:
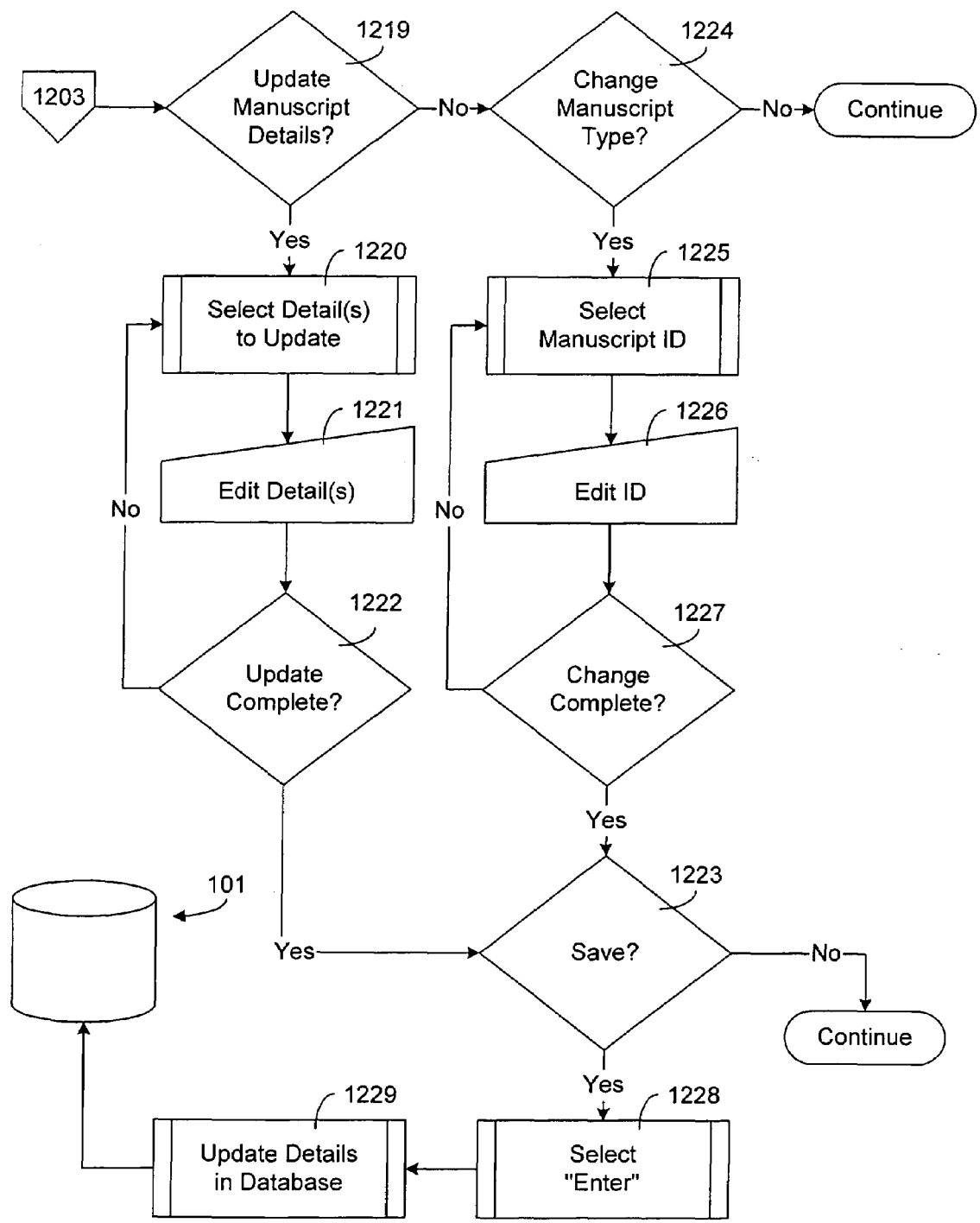
FIG. 12(d) is a flowchart generally illustrating a means for editing manuscript details in accordance with the present invention.

Another user option is shown in FIG. 12(d). The system 300 prompts the user with the question whether the user would want to update manuscript details at step 1219. If so, the user selects the detail(s) to update at step 1220, edits the details at step 1221, and answers a prompt from the system 300 with the question at step 1222 whether the update is complete. If so, the system 300 then prompts the user with the question whether to save the update at step 1223. If so, the user then selects "Enter" (not shown), whereupon the system 300 then updates the database 101 at step 1229.

Alternatively, the system may prompt the user at step 1224 with the question whether the user would want to change the manuscript type 1302 at step 1224. If so, the user must select the manuscript ID at step 1225, and edit that ID at step 1226. The system 300 then prompts the user with the question whether the change is complete at step 1227. If so, the save and updates steps 1223, 1228, and 1229 are then completed as described herein above.

Figure 12E:
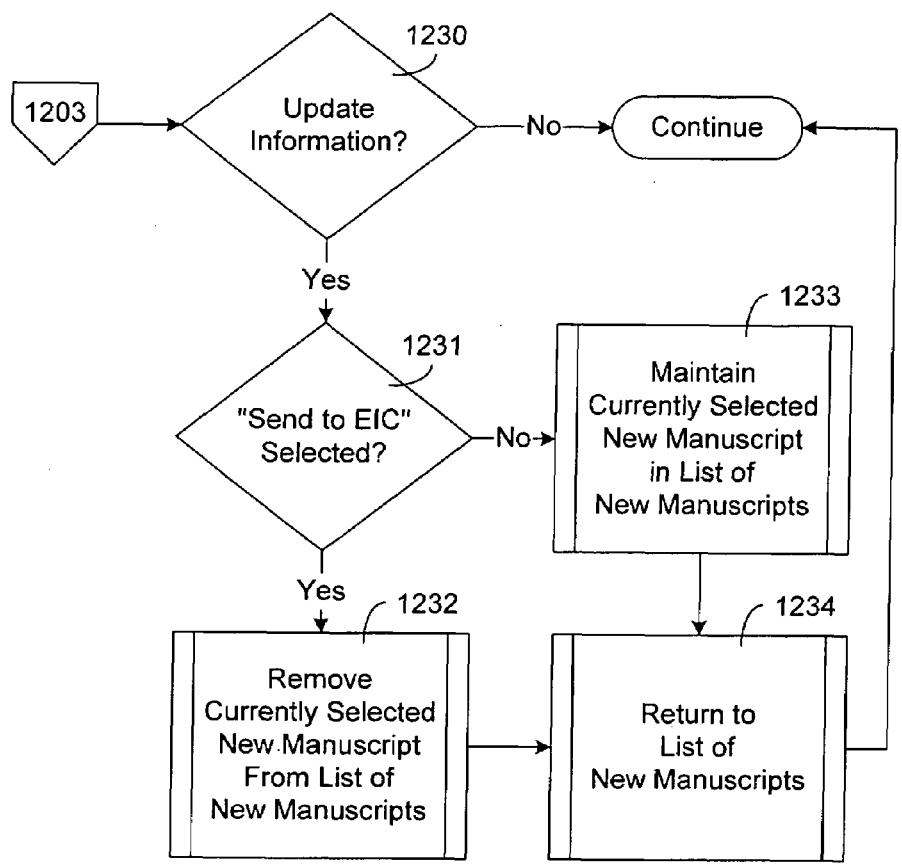
FIG. 12(e) illustrates a means for managing and routing a plurality of manuscripts with the administrator module shown in FIGS. 1 and 7.

As shown in FIG. 12(e) the system 300 may also prompt the user with the question whether the user would want to update information at step 1230. If so, the system 300 then prompts with the question at step 1231 whether the user has selected a "Send to EIC" button 1313. If so, the system 300 then removes the currently selected manuscript (e.g., a new manuscript which has not been assigned) from the list at step 1232, and returns to the list at step 1234. Otherwise, the system 300 will maintain the currently selected manuscript in the list at step 1233, and returns to that list at step 1234.

Figure 12F:
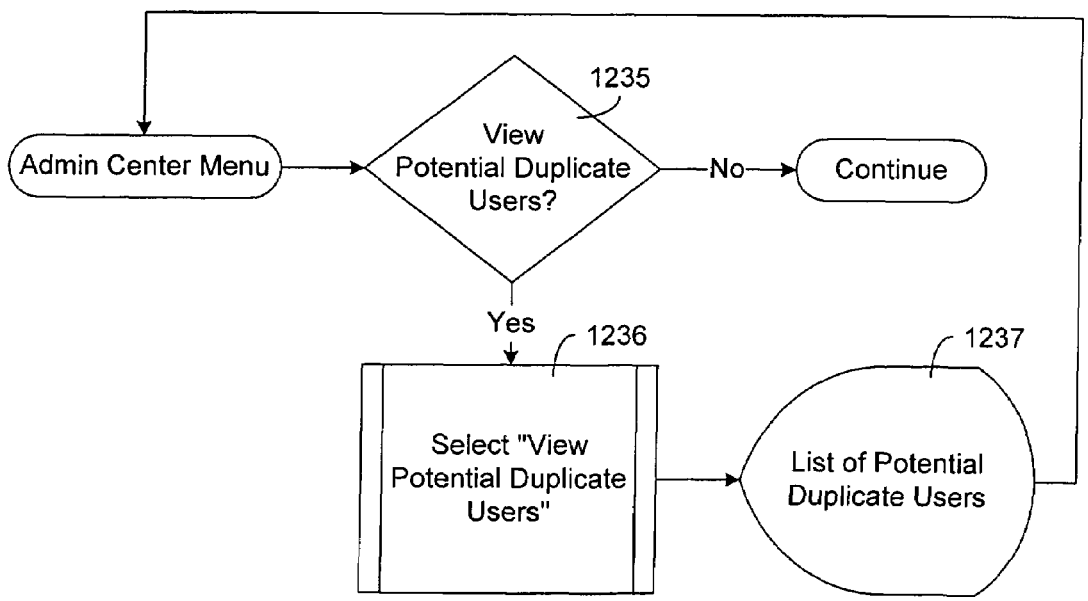
FIG. 12(f) is a flowchart illustrating a code segment in the administrator module, which provides a means for viewing duplicate users according to the present invention.
Figure 12G:
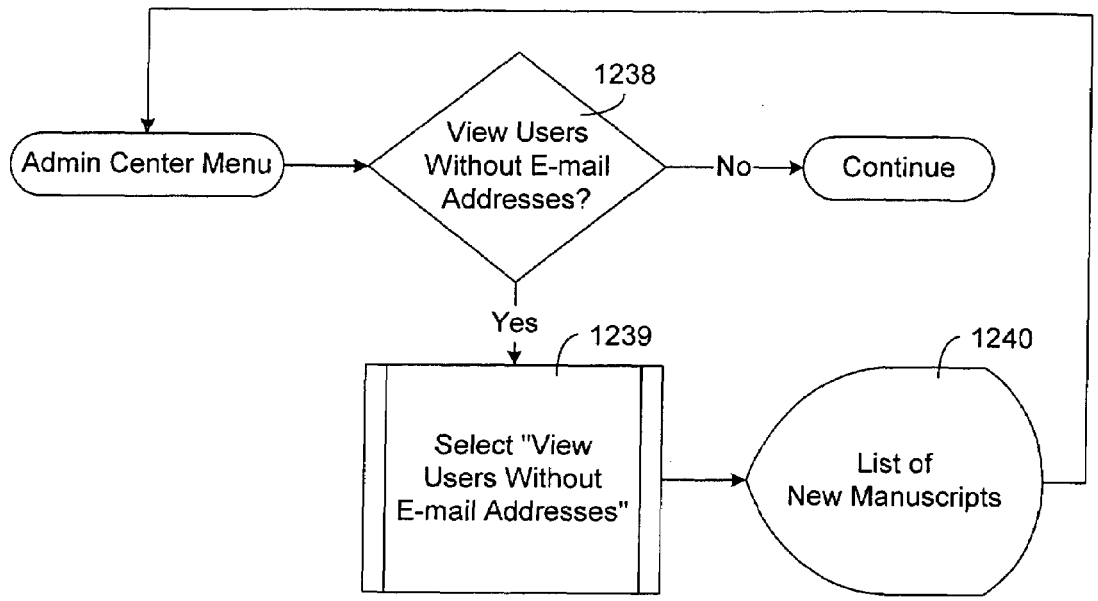
FIG. 12(g) illustrates another code segment in the administrator module, which provides a means for viewing users without e-mail addresses according to the present invention.
Figure 12H:
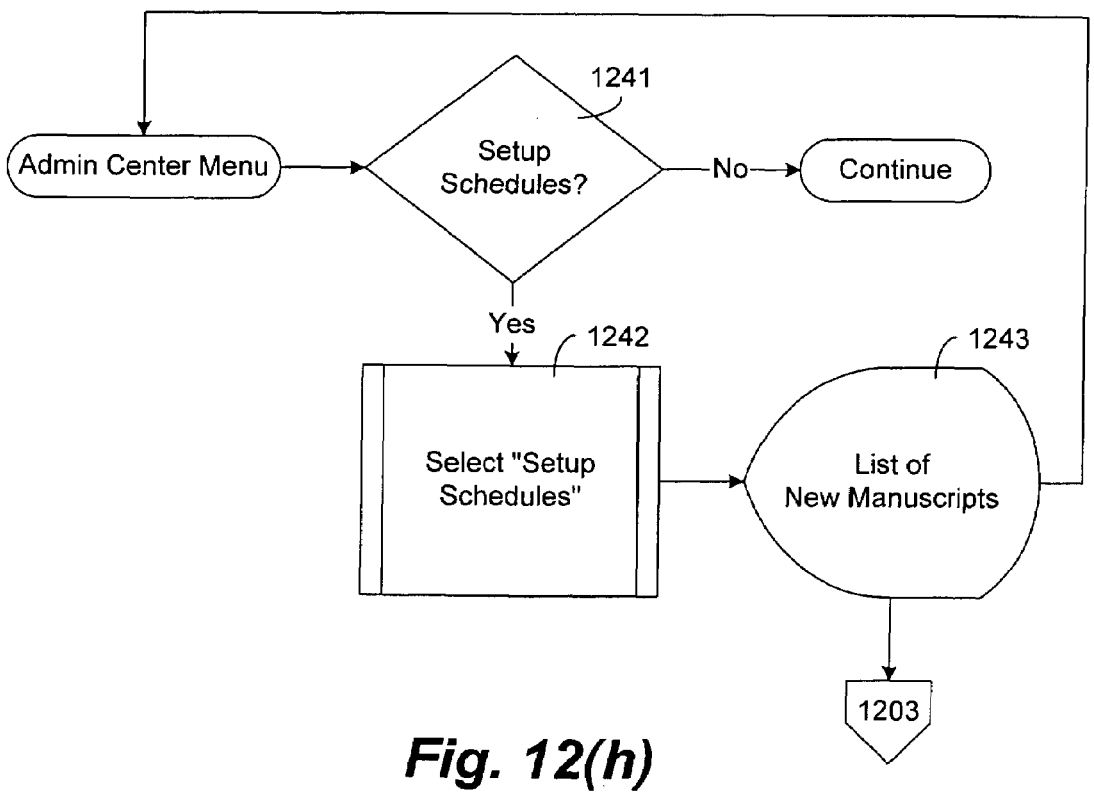
FIG. 12(h) is a flowchart illustrating yet another code segment in the administrator module, which provides a means for setting up schedules according to the present invention.
Figure 12I:
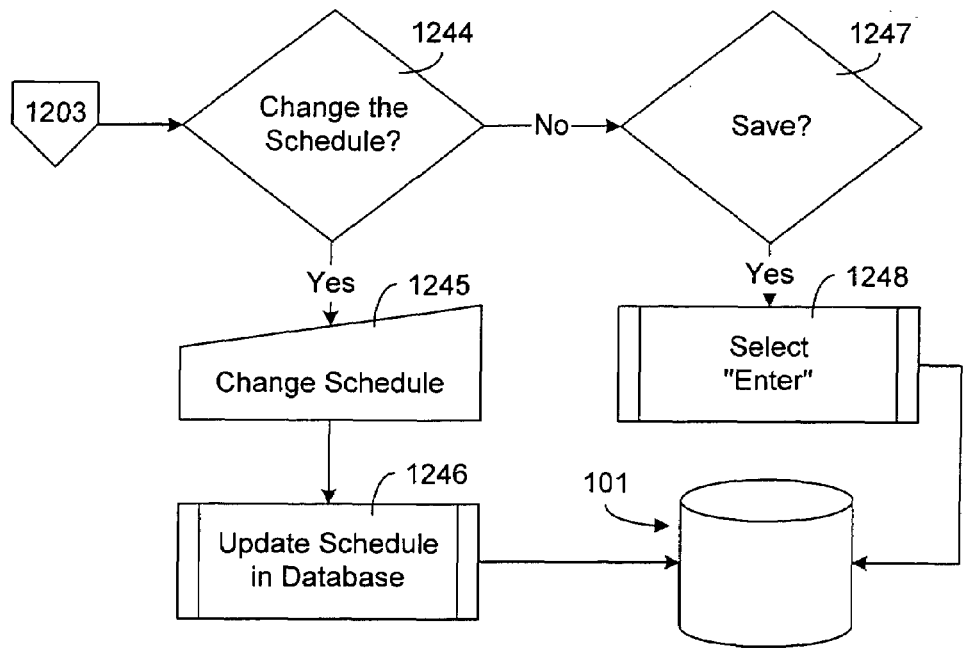
FIG. 12(i) illustrates still another code segment in the administrator module, which provides a means for changing schedules set up by the means shown in FIG. 12(h)

FIG. 12(f) describes other functionality provided to a user of the administrator center. For example, from the administrator center menu 1100, the system 300 can prompt the user with the question whether the user would want to view potential duplicate users at step 1235. If so, the user then would select a "View Potential Duplicate Users" hyperlink (not shown) at step 1236, wherein a list of potential duplicate users would be displayed by the system 300 at step 1237. Similar such processes for viewing users without e-mail addresses and setting schedules are respectively shown in FIGS. 12(g) and 12(h). Finally, and referring now to FIG. 12(i), the system 300 may prompt the user with the question whether the user would want to change the schedule relating to the review process at step 1244. If not, the system 300 then determines whether the user would want to save the schedule at step 1247, and the user would then select "Enter" at step 1248. If the user wanted to change the schedule, the user would do so at step 1245, and the system would then update the schedule in the database 101 at step 1246.

Editor-In-Chief Module

The Editor-in-Chief (EIC) module has the ability to assign Associate (or Review) Editors to oversee the peer review process for each manuscript. Access to each manuscript's information and its electronic file is instantly available upon the manuscript after having received clearance from the administrative center. Assignment of editors is facilitated through the use of a searchable editors database, with search fields for name, key words, and area of expertise. Each editor's personal information, number of assignments, and manuscript management history is displayed before assignment. Assignments will be made via e-mail communication, which grants access to the editor to that specific manuscript only. Re-assignments can be made at any time, through removal and new selection, as access to each assigned manuscript is maintained until a decision is rendered. All e-mails in the system are editable before sending in each center (except any system-generated, auto-e-mails, which are editable by accessing the admin center). The EIC should also have the ability to render an immediate decision on any manuscript, which in turn will render a decision e-mail to the corresponding author, and populate the database in all of the appropriate locations, such as each individual manuscript history.

The role of the EIC is to oversee the peer review of every manuscript and to assign each manuscript to a managing editor. The EIC must utilize the available data to make the appropriate selections based on expertise and workload, and maintain the ability to make changes to assignments up until final decision. The EIC also has the ability to render final decisions, and access all of the history of every submitted manuscript. Any e-mail from any center is editable so stock wording can be customized as necessary; this is especially useful for decision e-mails.

The EIC have access to all manuscripts and manuscript histories through a multi-field search function in the Editor-in-Chief center. The history should include but not be limited to the following: all of the steps of the peer review process and their dates of completion, all comments and reviews associated with the manuscript, all descriptive information about the manuscript, its peer review team and associated dates of response and assignment, and any correspondence associated with the manuscript. In order to support users and assist in the management of the peer review process, the ability to search for any manuscript and display its history is vital to the success of the system and the communication with its users. For the EIC, this information is mainly relevant in the monitoring of editor performance.

The EIC has numerous reports and listings available via links in the editor-in-chief menu and in the Reports Menu. The reports and listings can be customized per client, but several standard items are included with the system. Samples of listings include but are not limited to manuscripts with Associate (or Review) Editors, accepted and rejected manuscripts and outstanding revisions. Samples of reports include but are not limited to number of manuscripts by type, country, decision, and editor, time from submission to first decision and acceptance, time from Editor-in-Chief to Editor, time from Editor to reviewer, accept/reject ratios, reviewer listings and performance histories, and outstanding reviews. All reports and listings are vital to the management and subsequent tracking of and periodic reporting on the process of peer review.

The EIC have the ability to add to, maintain, edit, and update the user database on a limited basis. The database is searchable by name, key word, and area of expertise. The EIC can garner and add new reviewers by accessing the author's suggested reviewers listing, and otherwise assist in the maintenance of the user database. Other than reviewer status, however, the EIC cannot grant access rights or user IDs and Passwords. A searchable database will facilitate its manipulation and information retrieval.

Figure 14:
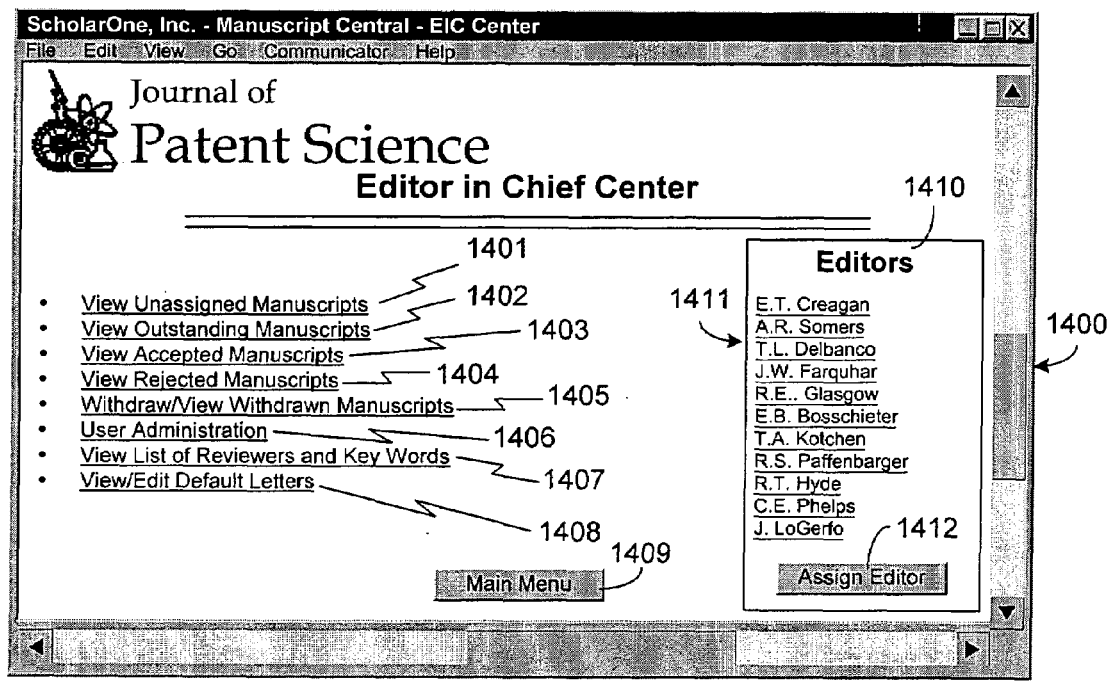
FIG. 14 illustrates a web page, which provides a means for accessing the editor-in-chief module shown in FIGS. 1 and 7.
Figure 15A:
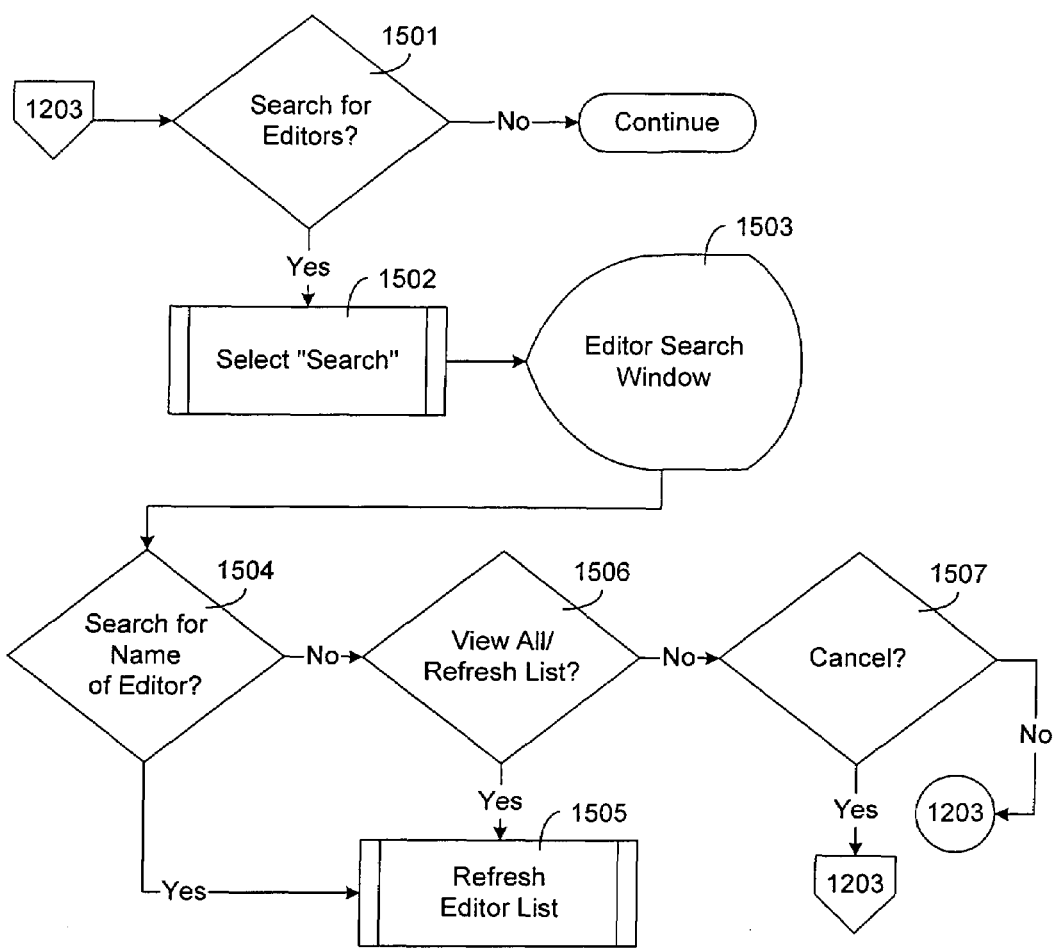
FIGS. 15(a) through 15(k) illustrate in further detail a flowchart, which implements the editor-in-chief module according to FIGS. 1 and 7.
Figure 15B:
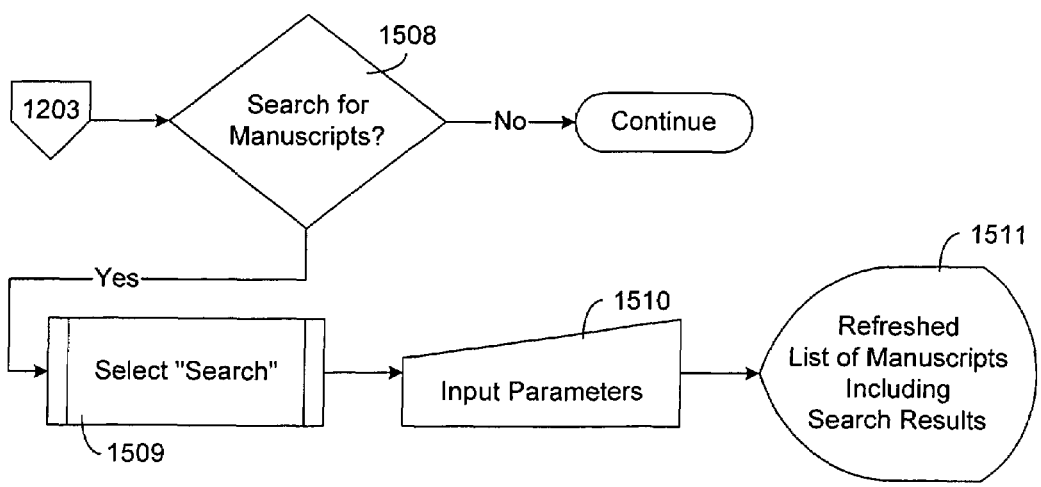
Figure 15C:
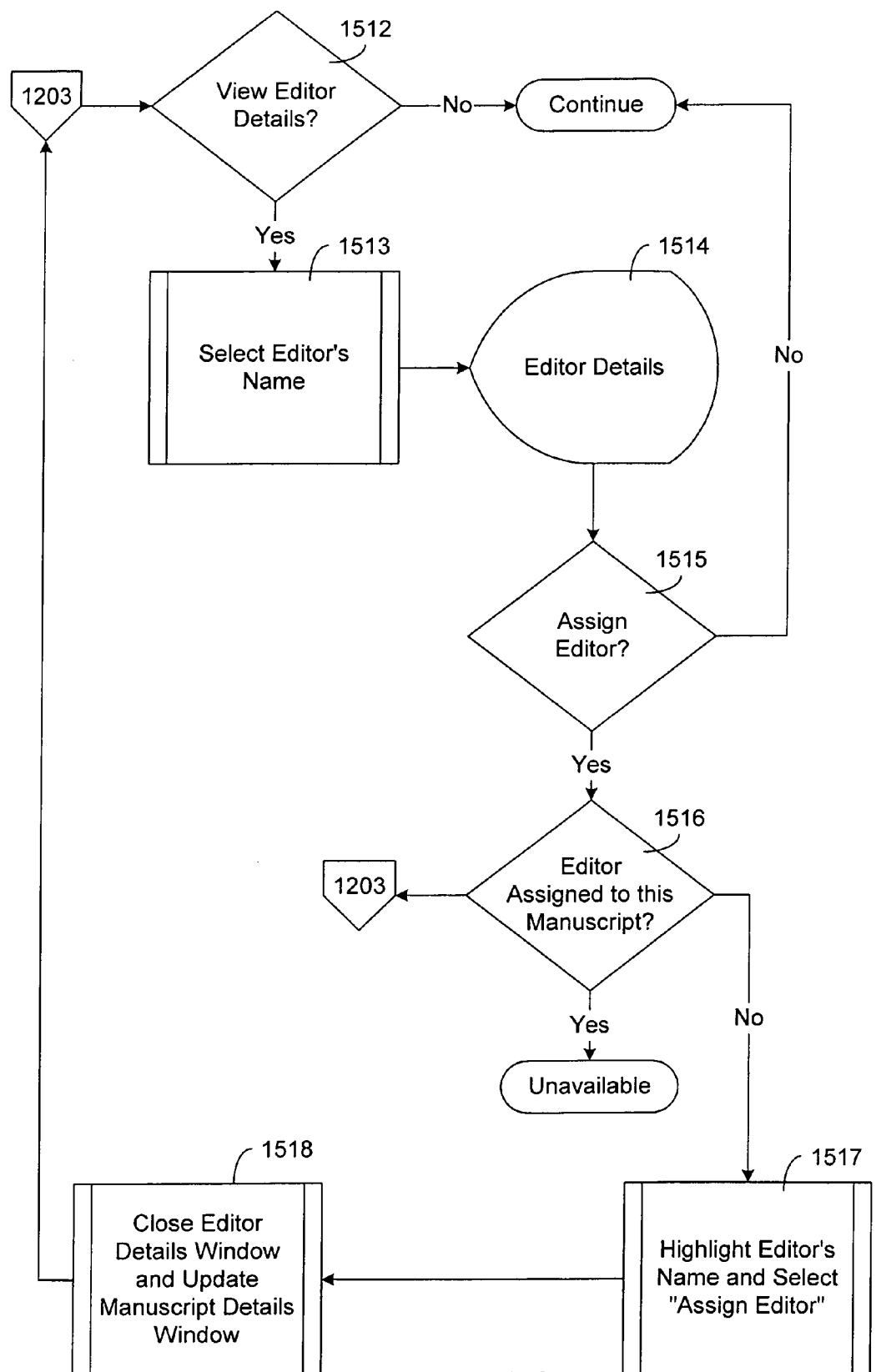
Figure 15D:
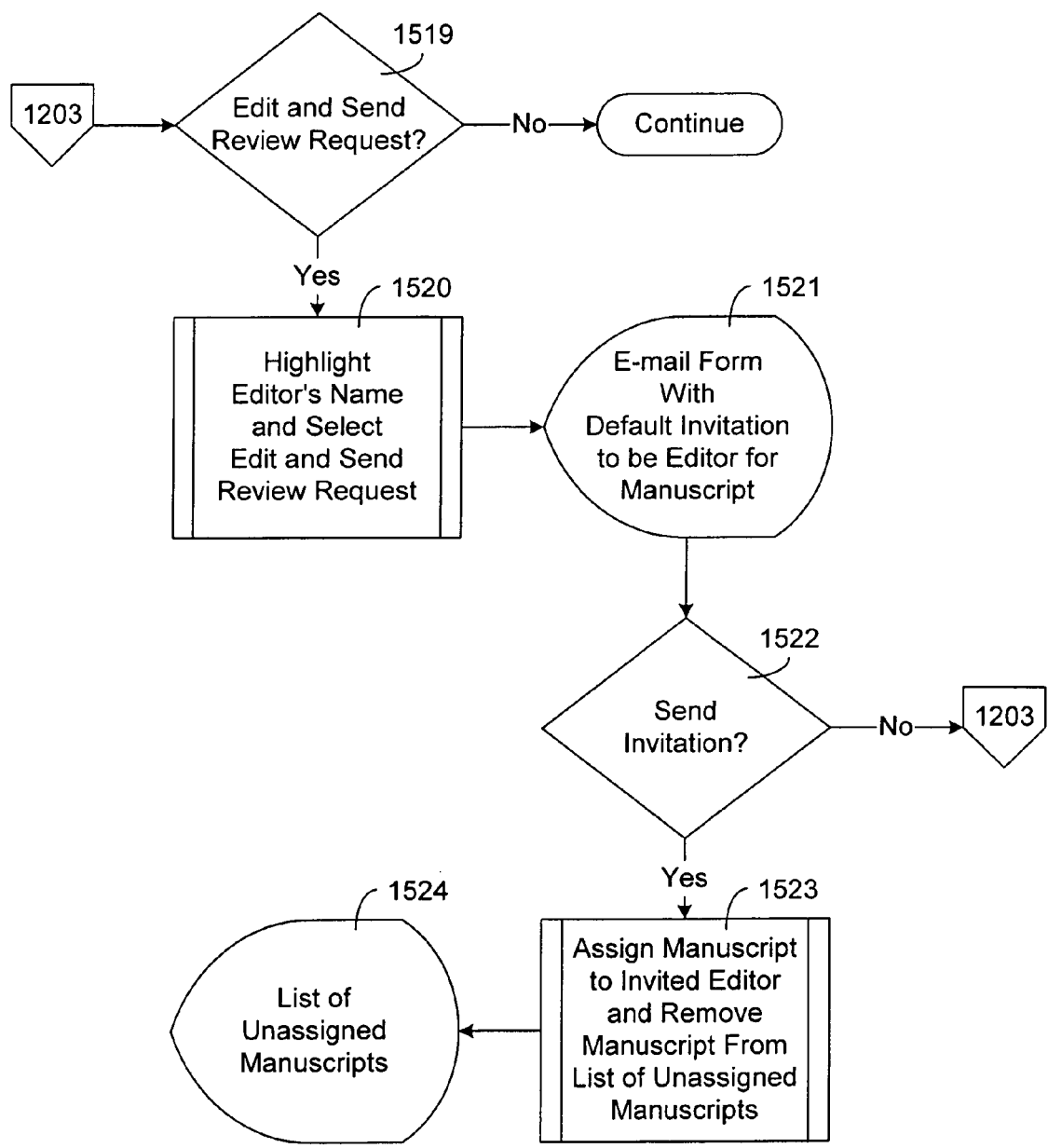
Figure 15E:
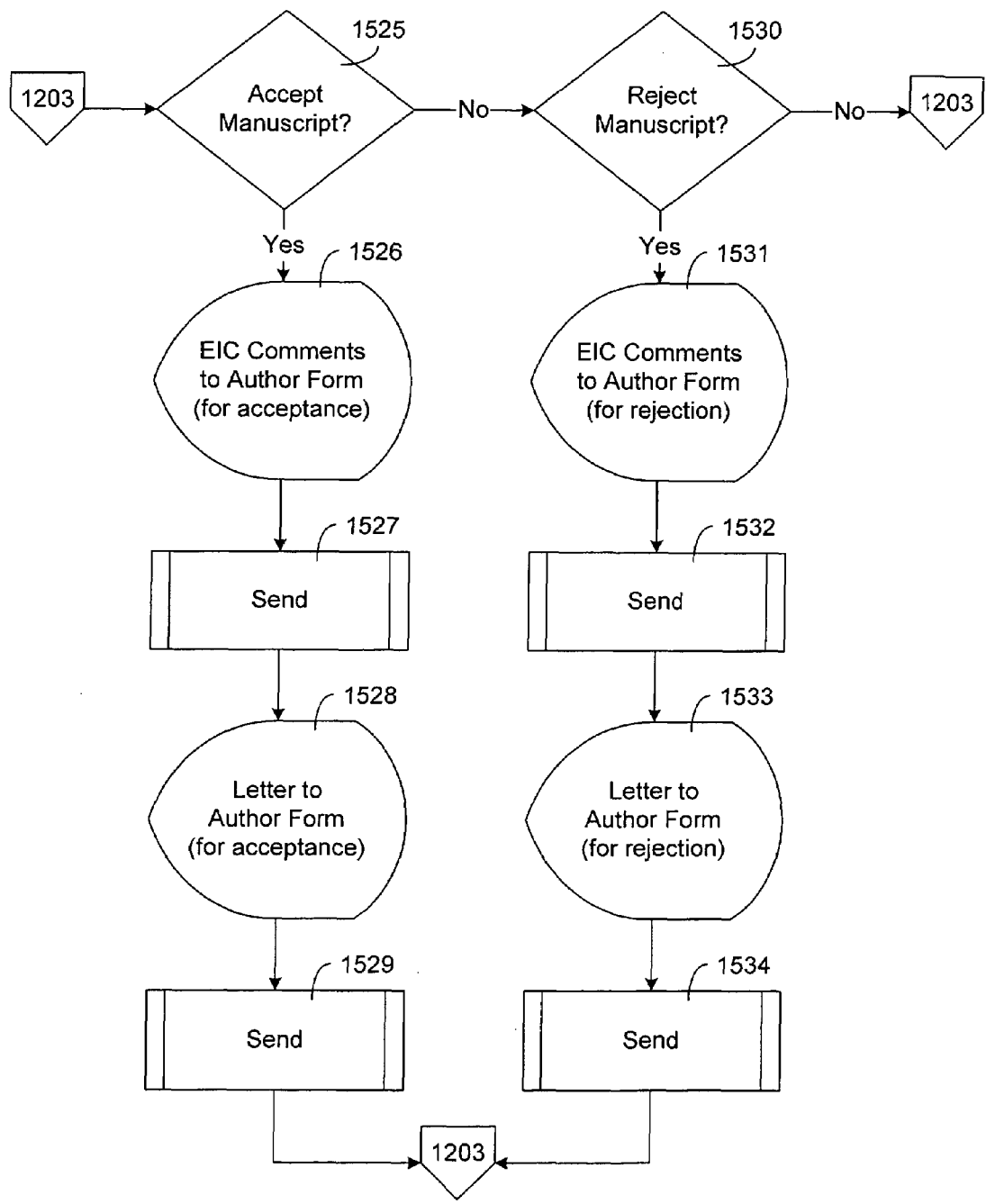
Figure 15F:
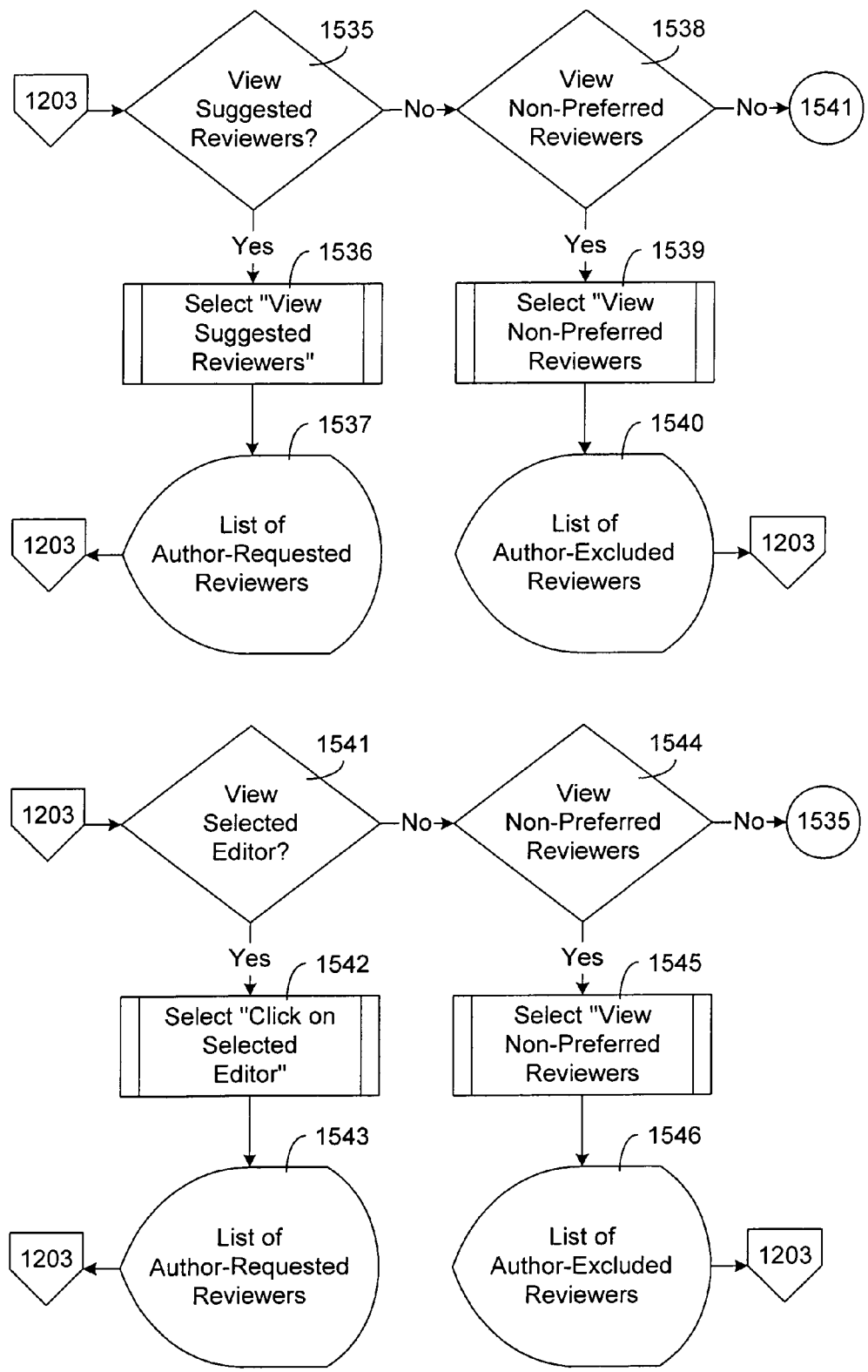
Figure 15G:
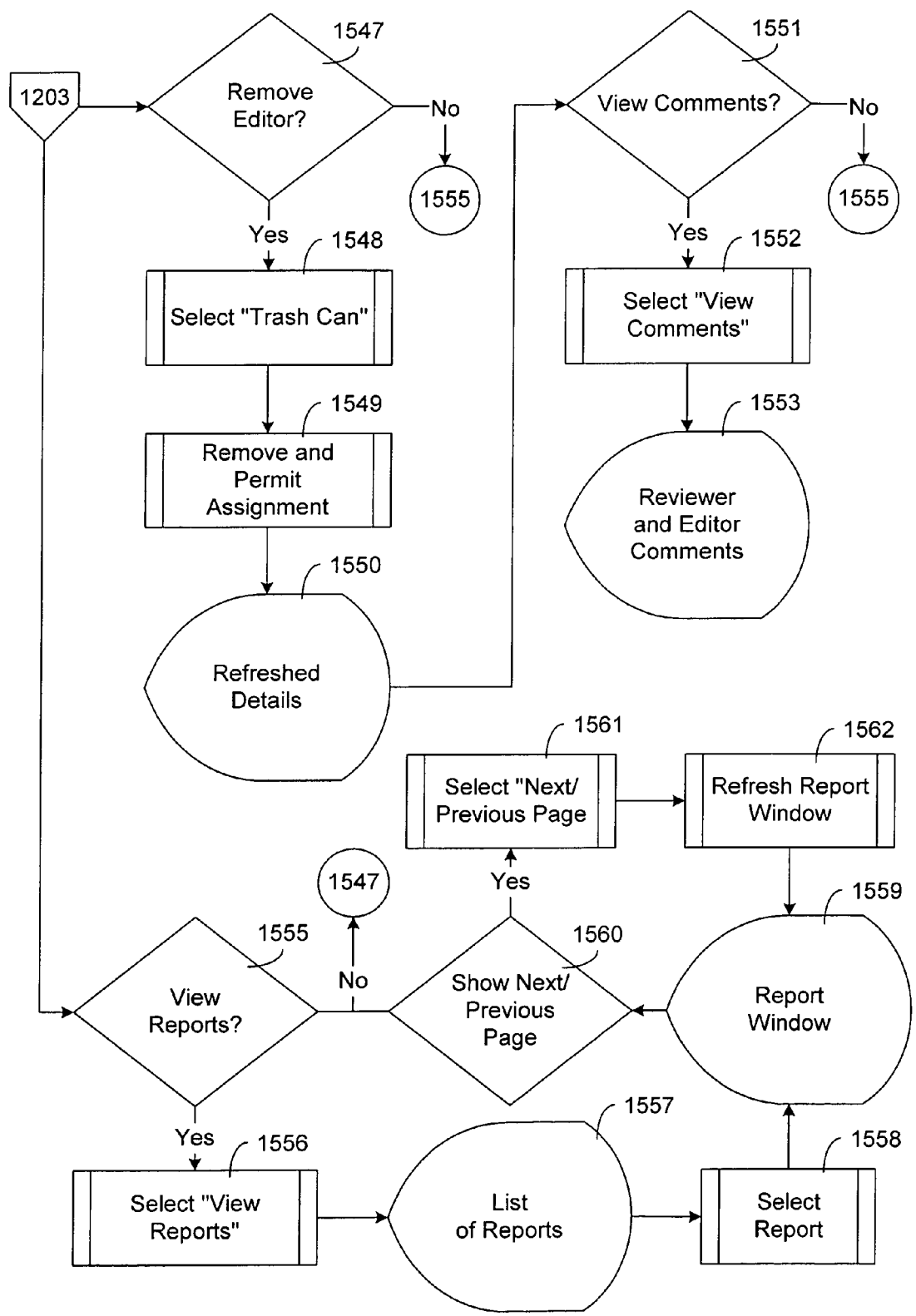
Figure 15H:
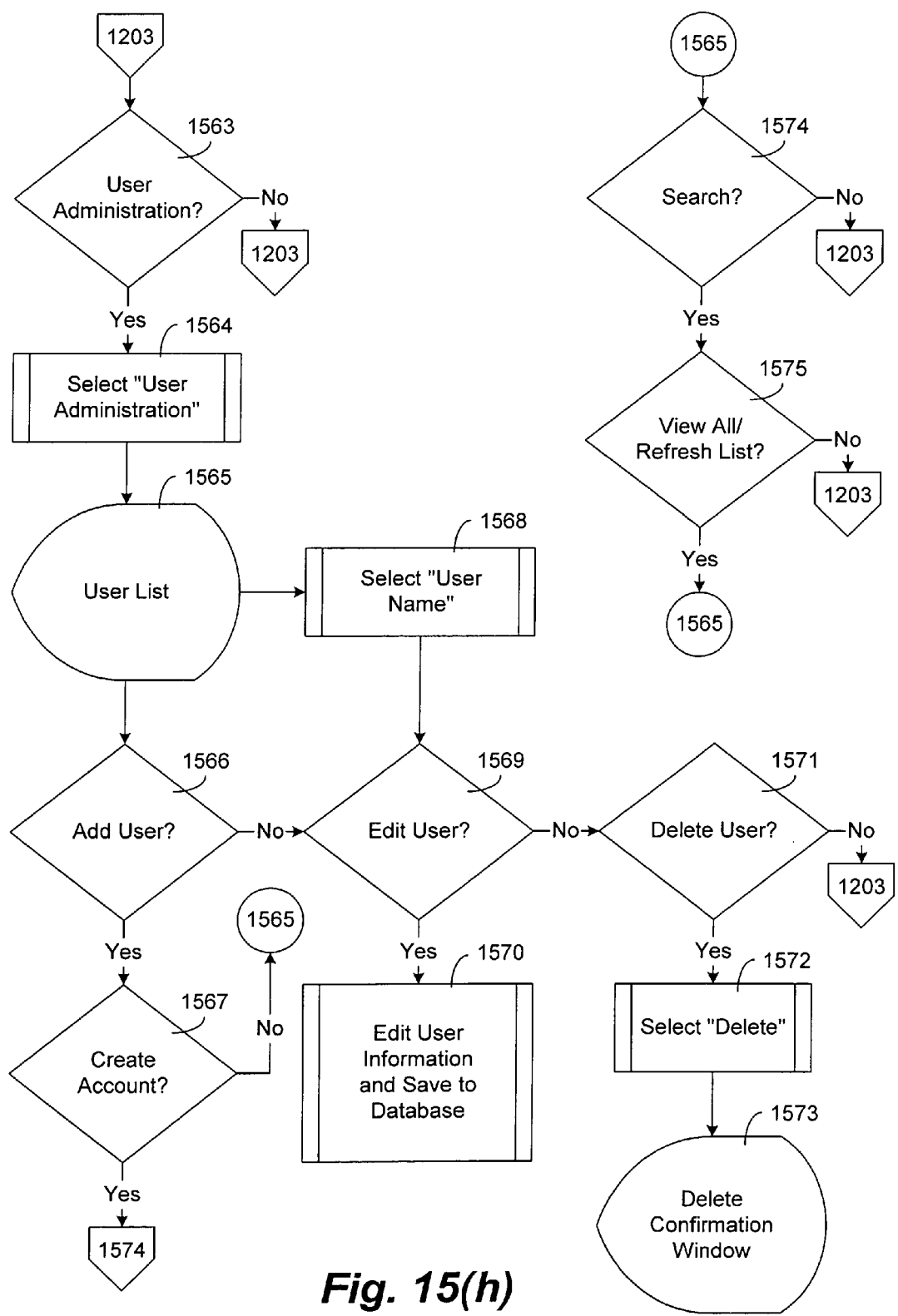
Figure 15I:
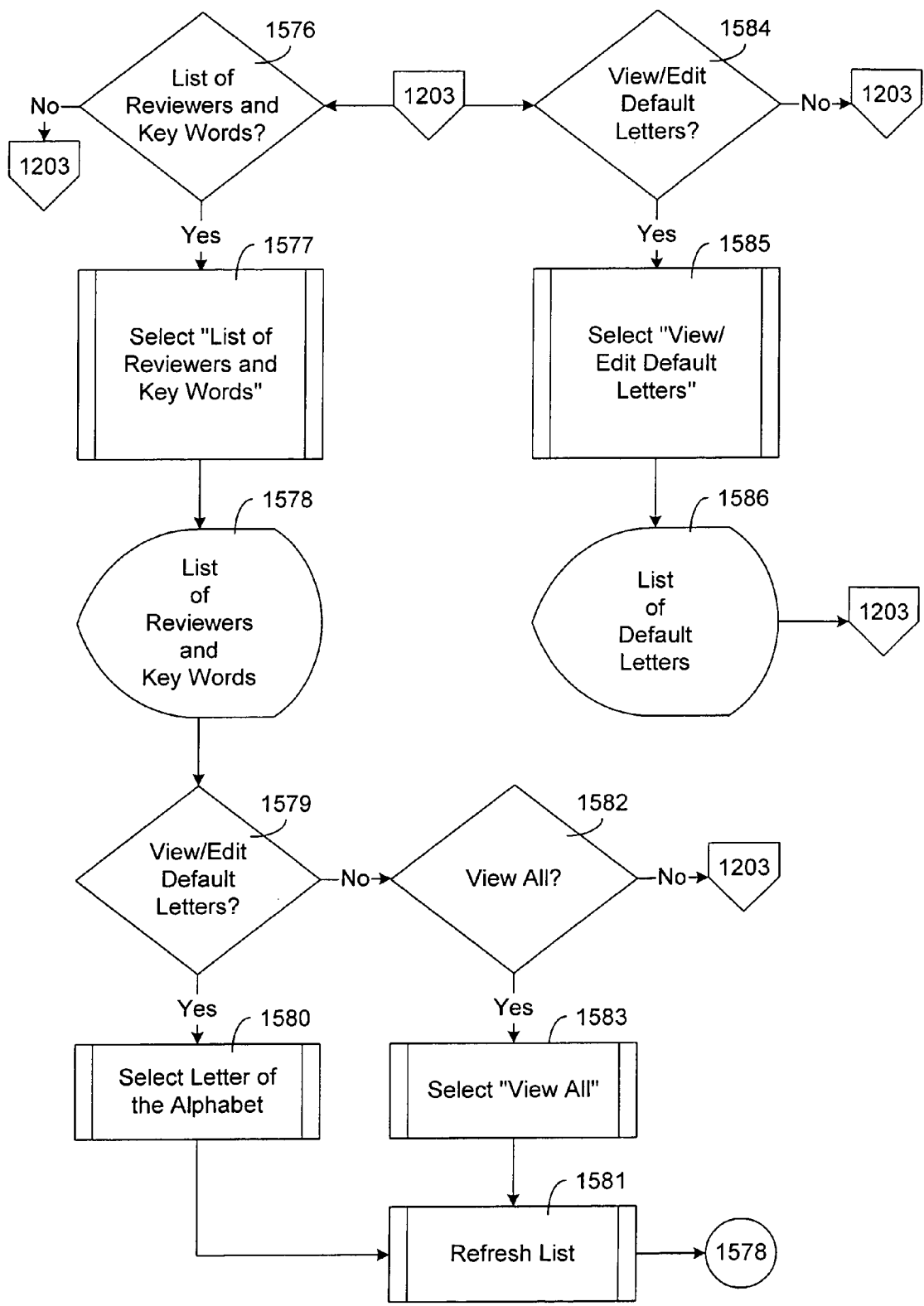
Figure 15J:
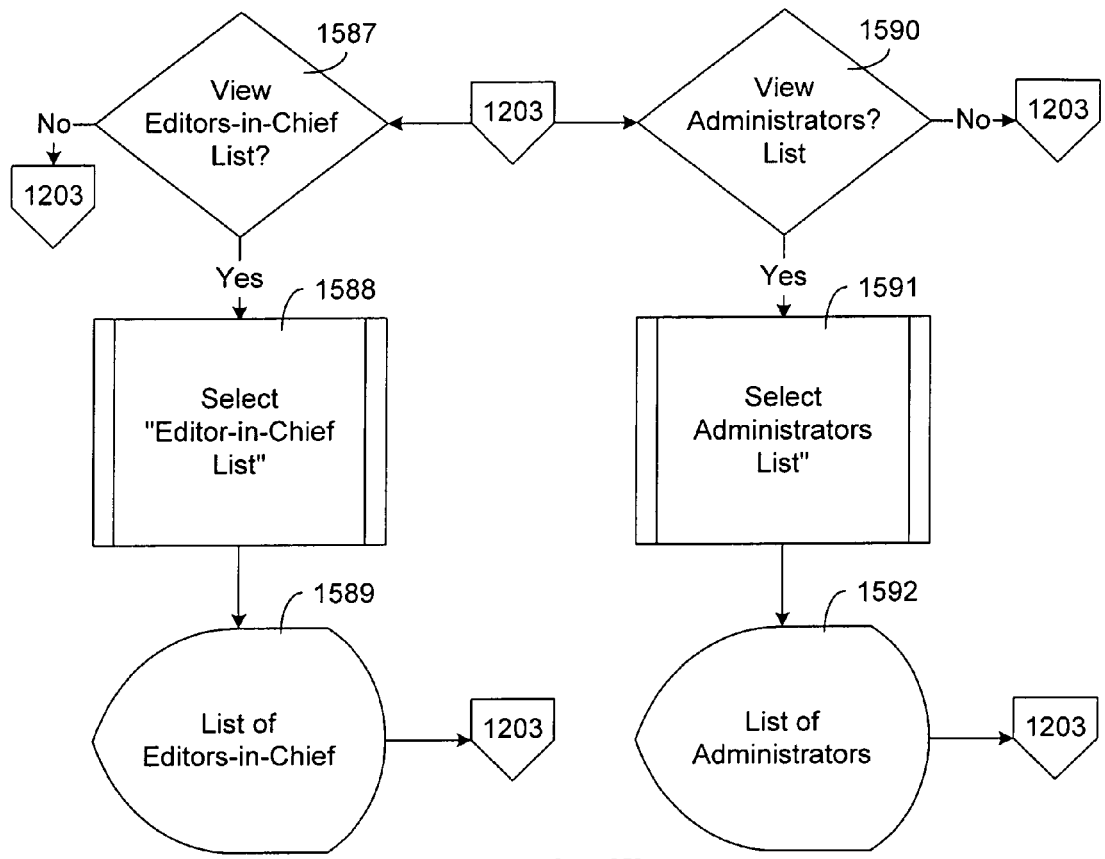
Figure 15K:
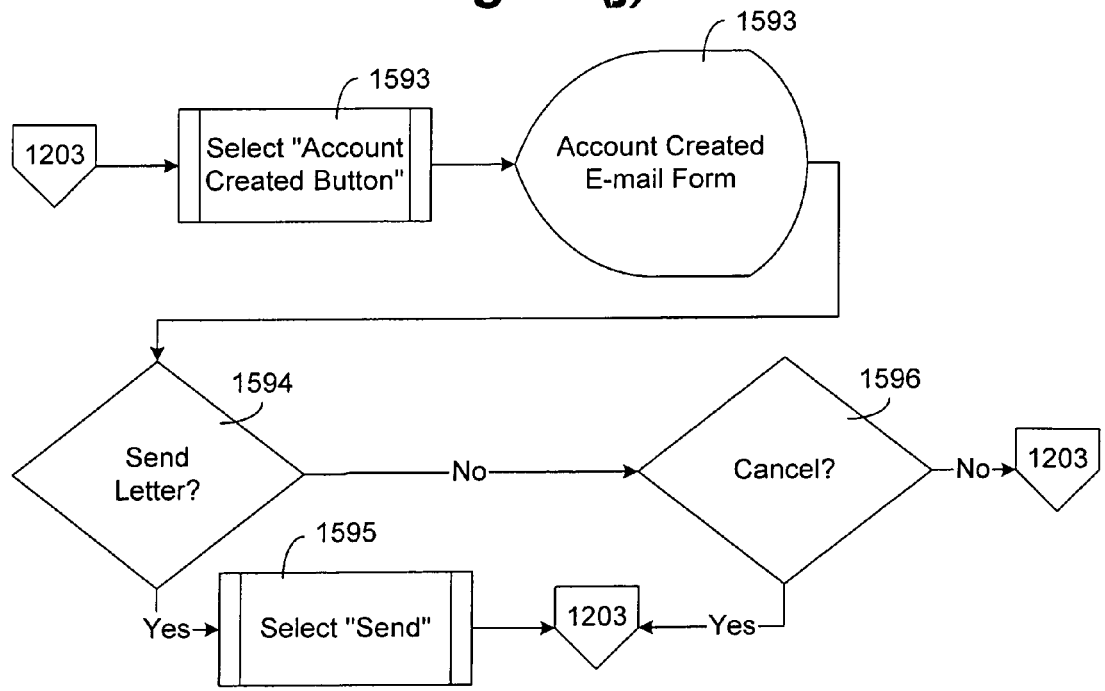
Figure 16A:
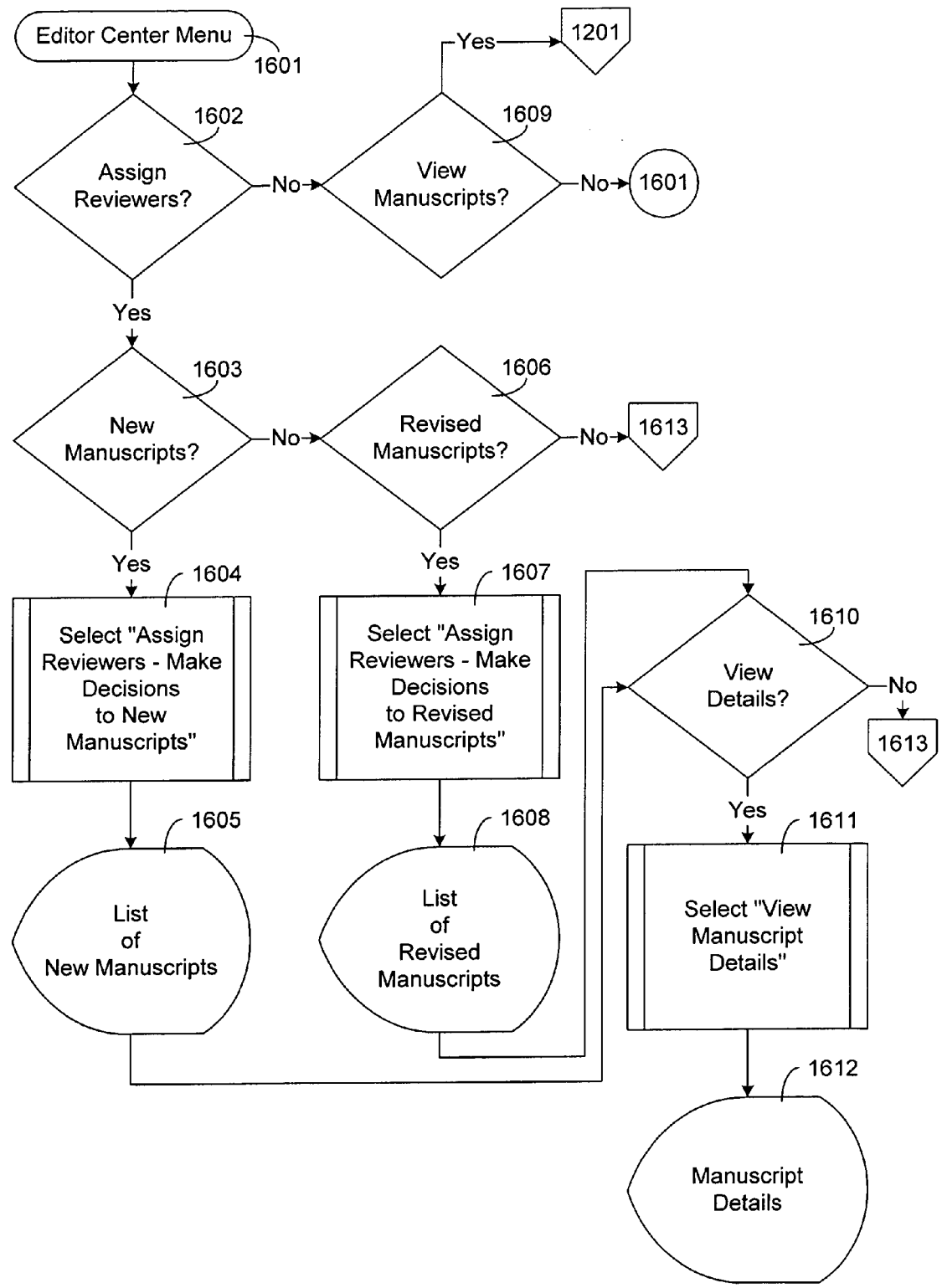
FIGS. 16(a) through 16(f) illustrate in further detail a flowchart, which implements the editor module shown in FIGS. 1 and 7.
Figure 16B:
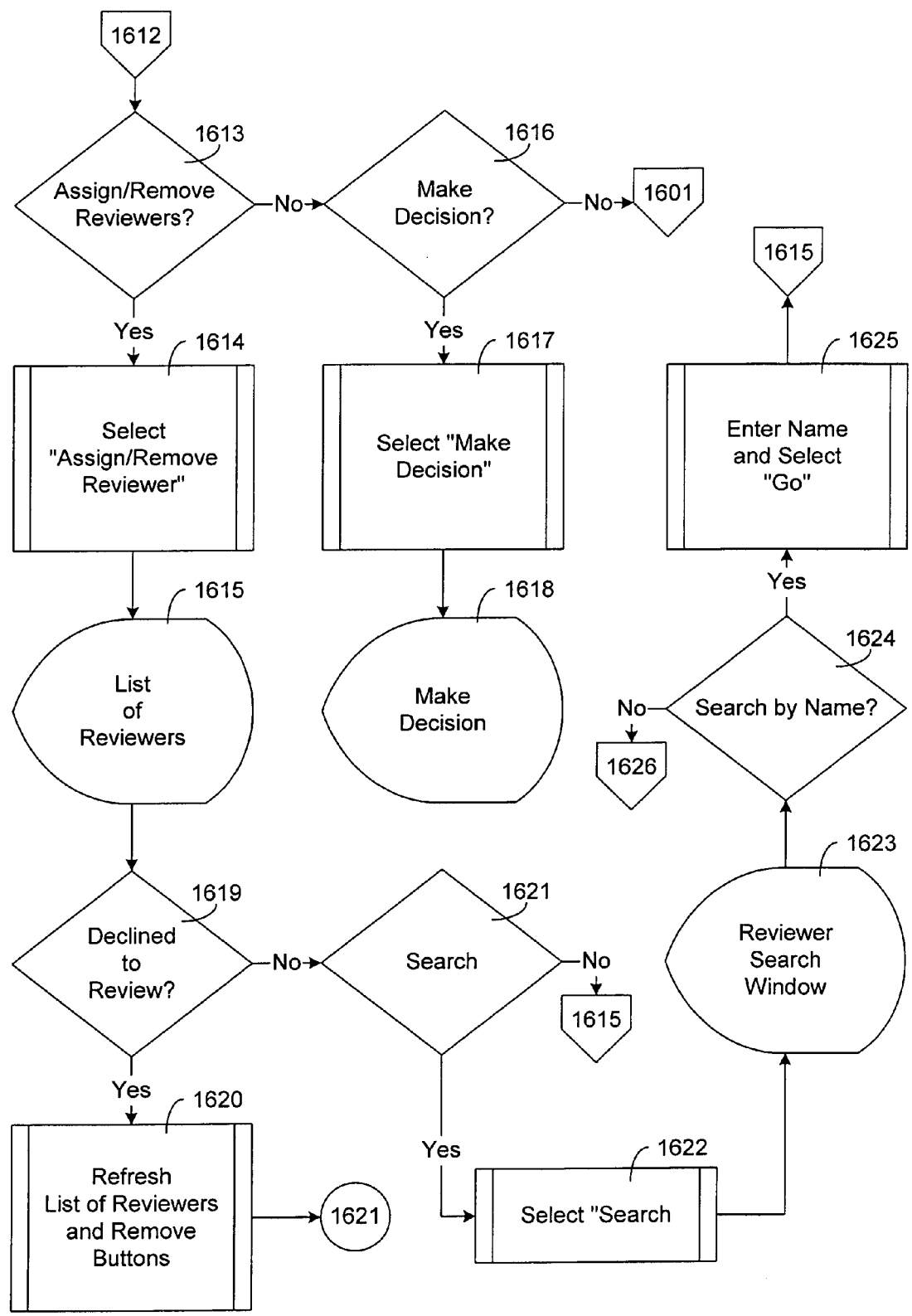
Figure 16C:
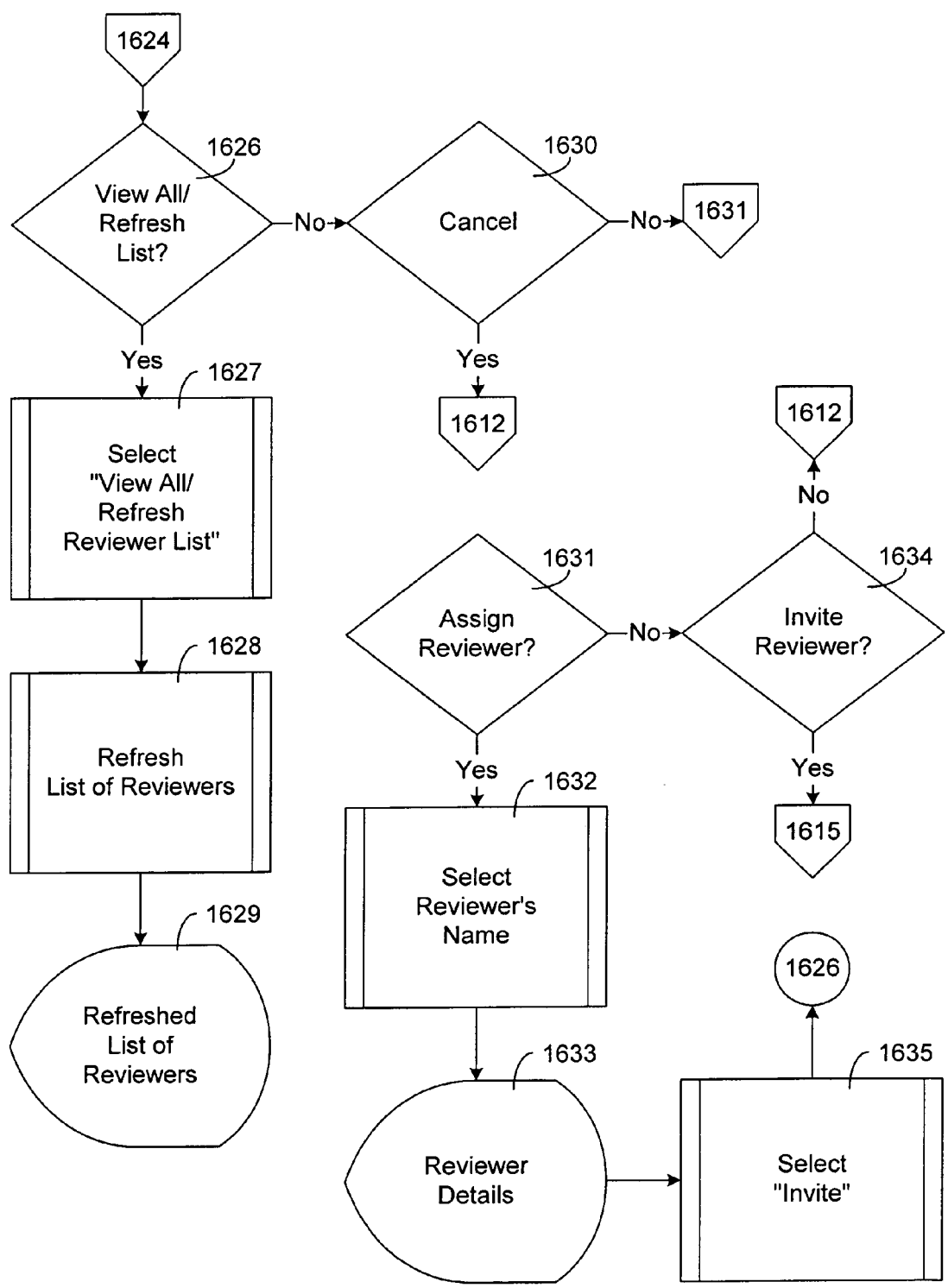
Figure 16D:
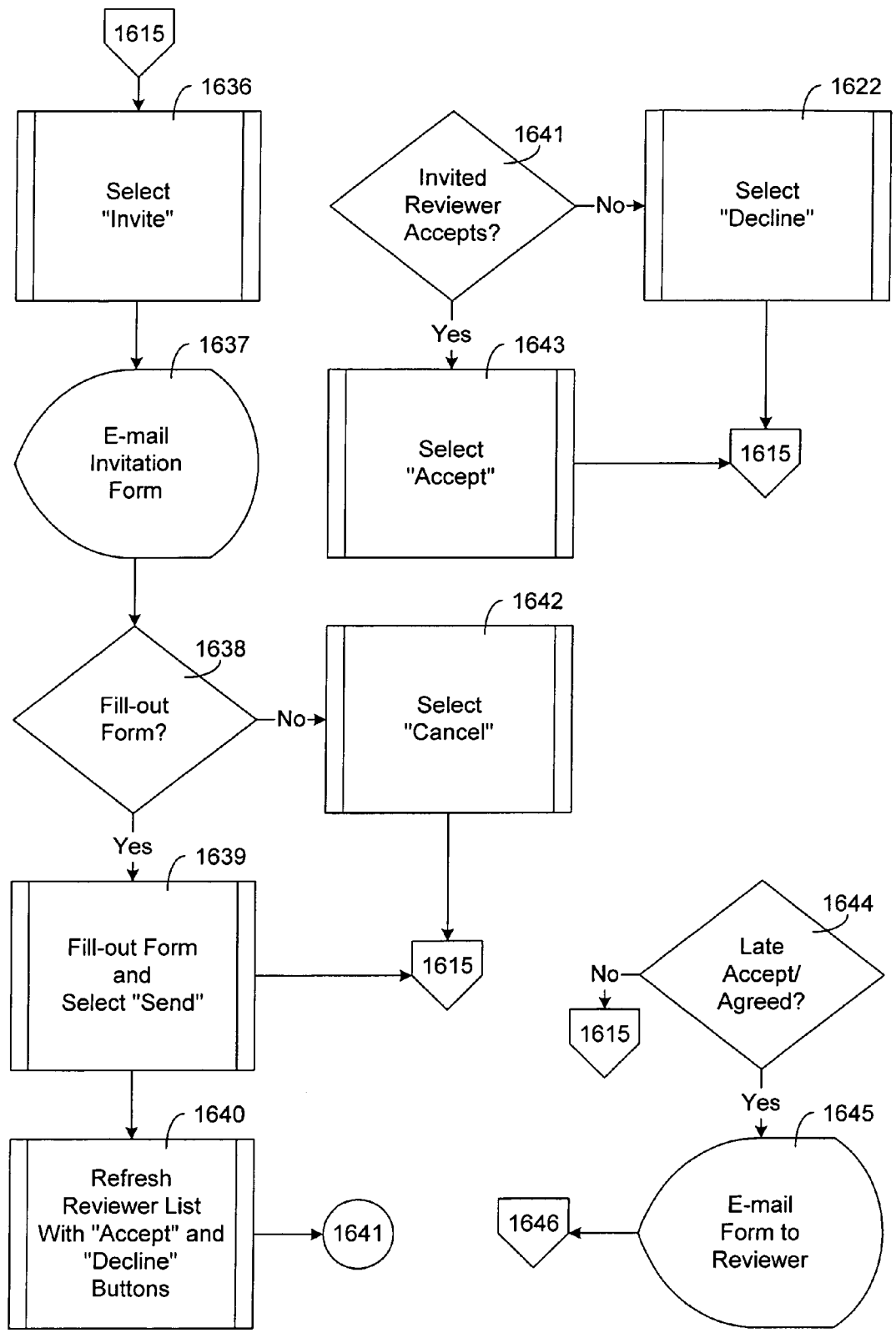
Figure 16E:
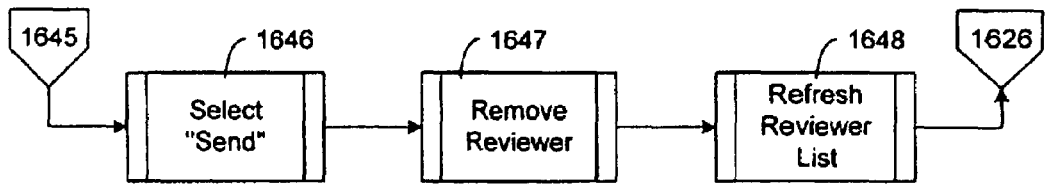
Figure 16F:
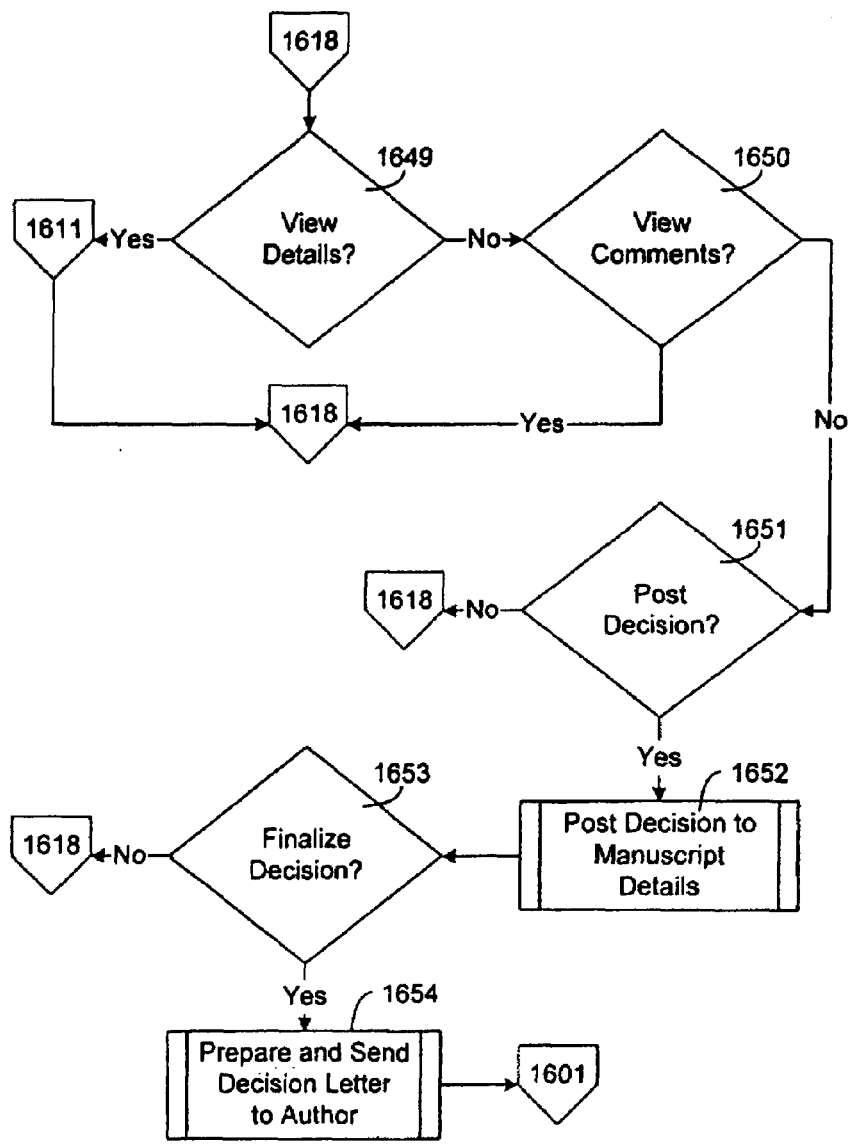

Referring now to FIGS. 14 and 15(*a*) through 15(*k*), the processes involved with the Editor Module will now be described. An Editor in Chief Center window 1400 is shown in FIG. 14. Like center menus previously described, the Editor in Chief menu 1400 includes various options 1401-1408. It also includes the ability to return to the main menu 700 by selecting button 1409. Also, the Editor in Chief menu 1400 includes a list 1410 of the available editors 1411, and an ability to assign those editors by selecting button 1412.

The system 300, for example, may prompt the EIC with the question whether to search for editors at step 1501. If so, the EIC must select "Search" at step 1502, whereupon an editor search window is displayed at step 1503. The system 300 then prompts the EIC with the question whether to search for an editor by name at step 1504. If so, the editor list 1410 is refreshed at step 1505 with the name of the editor searched included. The system 300 may also prompt the EIC at step 1506 with the questions whether to view all editors/refresh the list 1410. If not, the system 300 prompts the user with the questions whether to cancel at step 1507.

The EIC may also search for manuscripts. As shown in FIG. 15(*b*), the system 300 prompts the EIC at step 1508 whether to conduct that search. The EIC must then select "Search" at step 1509, and input the search parameters at step 1510, whereupon the list of manuscripts is refreshed, including the search results, and displayed at step 1511.

The system 300 may also prompt the EIC at step 1512 (FIG. 15(*c*)) with the question whether the EIC would want to view editor details. If so, the EIC selects the editor's name at step 1513 from the list 1410, and the editor details are displayed at step 1514. From there, the system 300 prompts the EIC with the question whether to assign that editor at step 1515. If so, the system 300 must determine at step 1516 whether an editor is currently assigned to that manuscript. If so, then further assignment at this point would be unavailable. If not, the EIC highlights the editor's name at step 1517, and the system 300 (at step 1518) then closes the editor details window and updates the manuscript details window.

As shown in FIG. 15(*d*), the EIC may also be prompted by the system 300 at step 1519 with the question whether to edit and send a review request. If so, the EIC then highlights the editor's name and presses an "Edit and Send Review Request" button or hyperlink (not shown). An e-mail form with a default invitation to be editor is then displayed to the EIC at step 1521, and the EIC is prompted by the system 300 with the question whether to send the invitation at step 1522. If so, the EIC presses "Send" or other such means, the system 300 assigns the manuscript, removes the manuscript from the unassigned list, and returns to display the list of unassigned manuscripts at step 1524.

Acceptance and rejection of the manuscripts is performed by the methods shown in FIG. 15(*e*). The system 300 prompts the EIC at step 1525 with the question whether to accept the manuscript. If so, an EIC Comments to Author Form (for acceptance) is displayed at step 1526. The EIC completes the form and sends it at step 1527, whereupon the system 300 displays a Letter to Author Form (for acceptance) at step 1528. Again, the EIC completes the form and presses send at step 1529. In the event that the EIC did not want to accept the manuscript as determined at step 1525, the system 300 would then prompt the EIC with the question whether to reject the manuscript at step 1530. If so, an EIC Comments to Author Form (for rejection) is displayed at step 1531. The EIC completes the form and sends it at step 1532, whereupon the system 300 displays a Letter to Author Form (for rejection) at step 1533. Again, the EIC completes the form and presses send at step 1534.

As shown in FIG. 15(*f*), the system 300 also may prompt the EIC with the question whether to view a list of reviewers suggested by the author at step 1535. If so, the EIC selects "View Suggested Reviewers" at step 1536, whereupon the system 300 displays a list of author-requested reviewers at step 1537. If not, the system 300 then prompts the EIC with the question whether to view a list of non-preferred reviewers at step 1538. If so, the EIC selects "View Non-Preferred Reviewers" at step 1539, whereupon the system 300 displays a list of author-excluded reviewers at step 1540.

The system 300 may also prompt the EIC with the question whether to view a selected editor at step 1541. If so, the EIC clicks on the selected editor at step 1542, and a list of author-requested reviewers is displayed by the system 300 at step 1543. Otherwise, the system 300 prompts the EIC at step 1544 with the question whether to view a list of non-preferred reviewers. If so, the same process as related to steps 1539 and 1540 is carried out at steps 1545 and 1546.

FIG. 15(*g*) illustrates the methods of removing an editor or viewing reports. For example, the system 300 may prompt the EIC with the question whether to remove an editor at step 1547. If so, the EIC selects "Trash Can" or similar such means at step 1548, the system 300 removes the editor's name from the manuscript details, and permits his/her reassignment for other manuscripts at step 1549. A refreshed details window is then displayed at step 1550. The system 300 then prompts the EIC with the question whether to review comments at step 1551. If so, the EIC selects "View Comments" at step 1552, and the system 300 displays the Reviewer and Editor Comments relating to that manuscript at step 1553.

The system 300 may also prompt the EIC with the question whether to view reports at step 1555. If so, the EIC selects "View Reports" at step 1556, whereupon the system 300 displays a list of reports at step 1557. The EIC then selects a report from that list at step 1558, and the system 300 displays a report window at step 1559. The EIC is then prompted by the system 300 with the question whether to show the next/previous page of the report at step 1560. If so, the EIC selects "Next/Previous Page" at step 1561, the system 300 refreshes the report window at step 1562, and the process continues as long as the EIC desires.

The EIC may also perform user administration. As shown FIG. 15(*h*), the system prompts the EIC at step 1563 with the question whether to perform user administration. If so, the EIC selects "User Administration" at step 1564, whereupon a user list is displayed by the system at step 1565. The system 300 then prompts the EIC with the question whether to add a user at step 1566. If so, the system 300 then prompts the EIC with the questions whether to create an account. If the EIC does not want to add a user, then the system 300 prompts the EIC with the question whether to edit a user at step 1569. The EIC then edits the user information at step 1570 and the system 300 saves it. Alternatively, the system 300 may prompt the EIC with the question whether to delete a user at step 1571. The EIC then selects "Delete" and the system 300 then displays a delete confirmation window at step 1573. The system 300 also prompts the EIC at step 1574 with the question whether to search the list. If so, a determination is made at step 1575 whether to view all/refresh that list. Other search strategies and administrative means are available to the EIC and shown in FIGS. 15(*i*), 15(*j*), and 15(*k*).

Editor Module

An Associate (or Review) Editor have the ability to assign reviewers (or referees) to review each manuscript for publication. Access to specifically assigned manuscript information and its electronic file is instantly available upon assignment from the Editor-in-Chief. Reviewer assignments is facilitated through the use of a searchable, reviewers' database, with search fields for name, key words, and area of expertise. Each reviewer's personal information, number of assignments, and manuscript review history is displayed before initial invitation to review. The number of assignments will vary per client and is customizable; furthermore, the ability to remove or change assignments is available until a final decision is rendered on the manuscript. Invitations will be made via e-mail communication. All e-mails in the system is editable before sending, in each center (except any system-generated, auto-e-mails). The AE should also have the ability to render an immediate decision on any manuscript, which in turn will render a decision e-mail to the corresponding author, and populate the database in all of the appropriate locations, such as each individual manuscript history.

The role of the AE is to manage the peer review of each assigned manuscript. The AE must utilize the available manuscript and reviewer data to make the appropriate selections based on expertise and workload, and maintain the ability to make changes to assignments up until decision. The AE also has the ability to render final decisions, and access all of the history of every submitted manuscript assigned to him or her only. Any e-mail from any center is editable so stock wording can be customized as necessary; this is especially useful for decision e-mails.

The AE should have the ability to grant access to each reviewer that agrees to review. This access is limited to the specific manuscript that the reviewer has agreed to review, and initiated a button that send an e-mail to the reviewer alerting him or her of the confirmed assignment. This access is removable by the AE at any time until a final decision is rendered. If a reviewer declines to review, is not needed, or accepts late and is no longer required for review, the AE has similar e-mails to select that mark the reviewer and manuscript history appropriately. Limited and specific access is paramount to the security required for peer review, and the AE controls this access based on the responses received from reviewers. Marking the reviewer response and performance is also crucial to the peer review process, as monitoring performance will dictate future selections and improve the quality of the reviewer database.

When revisions of previously submitted manuscripts are submitted, they should flow directly to the AE's center for re-assignment. Revisions appear behind a separate menu item than original submissions in the AE Menu. A complete history of the manuscript and its revision(s), including the reviewer and editor comments attributed to each version, will accompany each revision in the manuscript history. Any comments in reply to the editor or reviewers from the author are also displayed. Reviewers that have indicated a willingness to review the revision is automatically invited, and only need to be marked as agreed to gain access to the revision. The process should proceed as normal from that point on, and includes the ability to remove or change reviewer assignments until a final decision is rendered. The revision process does not need to flow through the Administration center like an initial submission. The AE may assume control over the final decision on revisions, and their peer review. Reviewers do not need to be invited to review manuscripts they have already indicated they will review, but the ability to remove or change assignments remains. All comments, versions, and data surrounding a manuscript are essential to a fair review and decision.

While the ability to make a decision is available to the AE at any time during the process, the AE has the ability within the reviewer assignment area to render decisions based upon reviewer recommendations. Decision options are presented, and a decision e-mail is presented including the reviewer comments; this e-mail is editable, then sent to the corresponding author, with assigned reviewers, the Editor-in-Chief, and the Administrative center copied on the notification, which is written to the database at that time. The AE typically makes the final decision on manuscripts and generates the decision letter. The database is marked accordingly, with all associated dates included. All other associated parties need to be notified of the decision, and an acceptance will initiate the production process.

The AE has access to all assigned manuscripts and manuscript histories through a multi-field search function AE center. The history should include but not be limited to the following: all of the steps of the peer review process and their dates of completion, all comments and reviews associated with the manuscript, all descriptive information about the manuscript, its assigned reviewers and associated dates of response and assignment, and any correspondence associated with the manuscript. In order to support users and assist in the management of the peer review process, the ability to search for any manuscript and display its history is vital to the success of the system and the communication with its users. For the AE, this information is mainly relevant in the monitoring of reviewer performance for timely decision-making.

The AE has numerous reports and listings available via links in the AE Menu and in the Reports Menu. The reports and listings can be customized per client, but several standard items are included with the system. Samples of listings include but are not limited to accepted and rejected manuscripts and outstanding revisions assigned to each specific AE only. Samples of reports include reviewer listings, reviewer performances, and outstanding reviews. All reports and listings are vital to the management and subsequent tracking of and periodic reporting on the process of peer review, along with the rendering of timely decisions.

The AE has the ability to add to, maintain, edit, and update the user database on a limited basis. The database is searchable by name, key word, and area of expertise. The AE can garner and add new reviewers by accessing the author's suggested reviewers listing, and otherwise assist in the maintenance of the user database. Other than reviewer status, however, the AE cannot grant access rights or user IDs and Passwords. A searchable database will facilitate its manipulation and information retrieval.

Much of the above is provided by means similar to the processes shown in regards to the EIC. For example, the editor center menu is similar in many respects to the EIC menu. FIGS. 16(*a*) through 16(*f*) illustrate those methods which are different.

Beginning at the editor center menu 1601, the system prompts an editor at step 1602 whether to assign reviewers. If not, the system 300 then prompts the editor with the question whether to view manuscripts at step 1609. Otherwise, the system 300 prompts the editor with the questions whether the manuscripts to be viewed are new manuscripts or revised manuscripts. The editor then selects the appropriate type of manuscripts at steps 1604 or 1607, and the list of such manuscripts is displayed by the system 300 at steps 1605 or 1608. In either case, the editor is then prompted by the system 300 with the question whether to view the manuscript details at step 1610. The editor then selects "View Manuscript Details" at step 1611, and the system 300 displays those details at step 1612. Specific methods of assignment or removal of the reviewers are shown in FIGS. 16(*b*) through 16(*e*). Moreover, methods in which the EIC finalizes any decisions are shown in FIG. 16(*f*).

Reviewer Module

Reviewers (or Referees), once responding positively to e-mail inquiries about the review a manuscript, have the ability to access the electronic file of the specific manuscript agreed to, and all of its related and relevant information. Reviewers have the ability to print out the manuscript as well. Any manuscripts in need of review will appear in an ordered listing by manuscript number. Reviewers need quick access to the manuscript and its data, and typically need to print the manuscript for closer review and notes. Manuscript number, along with other related data (such as title and author(s)) identifies E-mail communications concerning manuscript review, in order to ensure an accurate and secure review process.

Reviewers will have links to instructions for review and all of the necessary manuscript information. Understanding what is required for review and the background data related to a manuscript enables the opportunity for a fair and successful review, while allowing for exceptions, such as conflict of interest, to be noted immediately to the managing editor.

When reviewing revisions of previously submitted manuscripts, reviewers have access to the following: all of the manuscript versions and their associated data, any comments or responses from the author(s) to the reviewers and the Associate Editor, the original decision letter(s) including all editor and reviewer comments, and any of their own original reviews and comments. In order to complete a fair review, all manuscript versions, data, editor and review comments, and original reviews are necessary for reference and consideration.

Reviewers have a client-approved score sheet for scoring the manuscript, comment boxes for detailed remarks, and recommendation options for the manuscript decision, data that is carried into and displayed with the manuscript's history. Judgment on adherence to specific client policies are also available, along with the other possible client-specific recommendations, and the notation of willingness to review and possible revisions of the manuscript, all of which is also displayed with the manuscript's history.

Reviewers have the ability to compose their remarks in a word processor and copy and paste them into the review forms. They then have the option to reset their review and start over; save their review and return to it; or submit their review the Associate Editor and automatically remove their access to the manuscript pending further notice. Reviewers need the ability to begin a review, leave it for any reason, and then return to it when convenient. They also may wish to reconsider and revise their review before finally submitting it. Once it is finally submitted, access to the manuscript are removed to ensure manuscript confidentiality.

Figure 17:
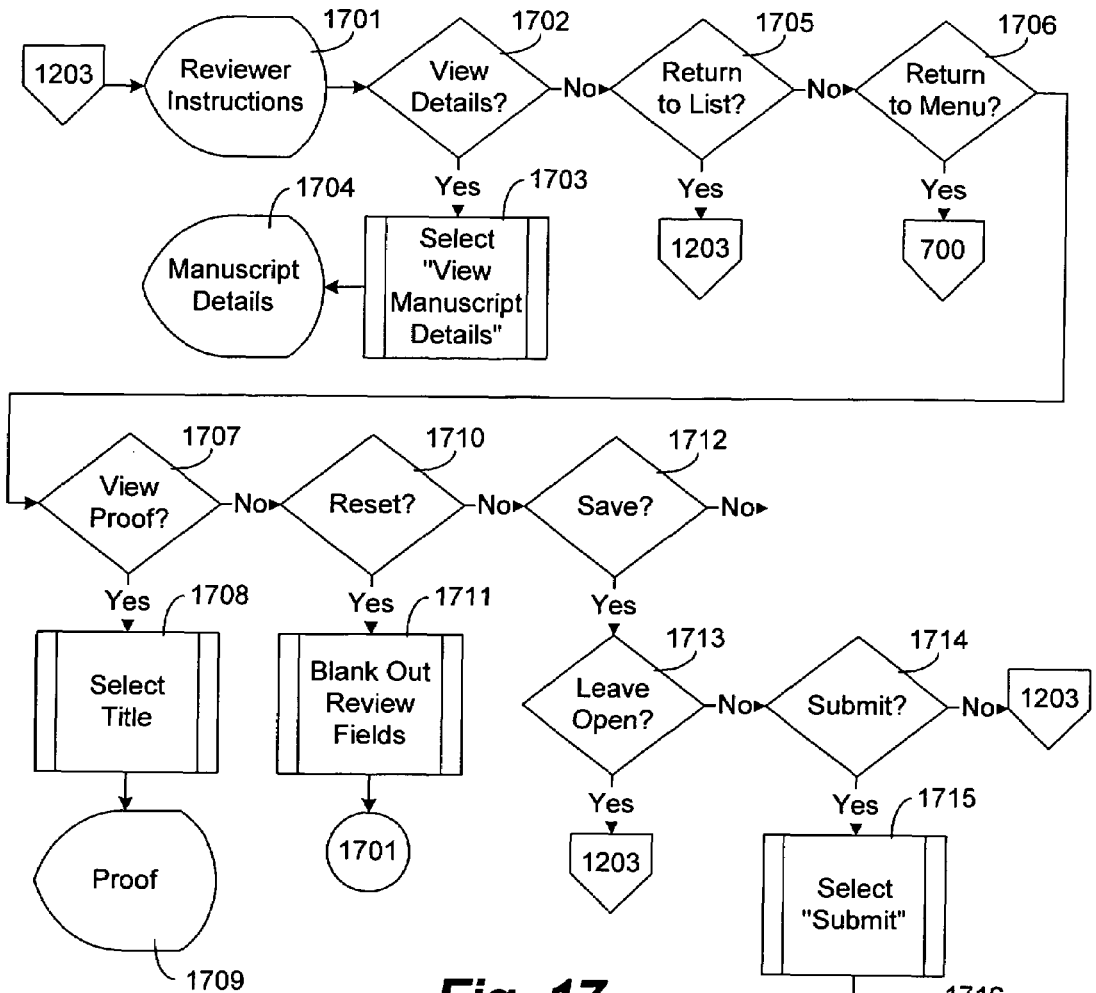
FIG. 17 illustrates in further detail a flowchart, which implements the reviewer module according to FIGS. 1 and 7.

The method of reviewing manuscripts in accordance with the present invention are shown in FIG. 17. Starting at a display of reviewer instructions at step 1701, the reviewer is prompted with the question whether to view the details of manuscripts assigned to him/her. If so, the reviewer selects "View Manuscript Details" at step 1703, and those manuscript details are displayed by the system 300 at step 1704. The reviewer may also be prompted by the system whether to return to the list of manuscripts (step 1705) or return to the reviewer menu (step 1706).

In the event those questions are answered in the negative, the reviewer is then prompted with the question whether to view the manuscript proof at step 1707. If so, the reviewer selects a title at step 1708, and the proof is displayed at step 1709. In the event that the reviewer did not want to view a proof, the system 300 prompts the reviewer with the question whether to reset the review form at step 1710. If so, the system 300 blanks out the review fields at step 1711 and the reviewer may start all over. If not, the system prompts the reviewer at step 1712 whether to save the review form. If so, a determination is made at step 1713 whether to leave the form open (i.e., remain outstanding for review). If not, the system 300 prompts the reviewer whether to submit at step 1714. If so, the reviewer then selects "Submit" at step 1715, the system 300 removes the title from the list of manuscripts at step 1716. Preferably, in all cases, a plurality of reviewers are used to review each submitted manuscript.

Miscellaneous Requirements

Some clients should process the final decision on a manuscript through either the Editor-in-Chief center or a separate center reserved for editorial board members. Associate (or Review) Editor decisions is considered preliminary, and the EIC or editorial board have the ability to make the preliminary decision final, or recommend and implement a change of that preliminary decision. All decisions and their accompanying data (such as date of final decision) are written accordingly in the database. Some clients prefer to consider the recommendation of the assigned Associate (Or Review) Editor before having their EIC, a group of editors, or a predetermined editorial board make a final, official decision on a manuscript concerning publication. All of this data is tracked in the database for reporting.

The listing of manuscripts with preliminary decisions is generated with a date range query, and provide access to the electronic file of each manuscript, along with all of its historical data and associated reviewers, scores, comments, and (editable) preliminary decision letters. The final decisions will be rendered on a regular schedule and the data needs to drawn accordingly. All of the relevant versions of the manuscript and their historical data need to be available to ensure a fair decision is made. If the preliminary decision is approved, the accompanying decision letter may need some revision before being sent.

System Details

In a preferred embodiment of the present invention, system 100 runs as an Internet-based application, using a conventional web server (e.g., the Apache HTTP server, version 1.3) which is compiled with PHP. The Apache server, as is well known, consists of voluntary contributions made by many individuals on behalf of the Apache Group. It was originally based on public domain software written at the National Center for Supercomputing Applications, University of Illinois, Urbana-Champaign. For more information on the Apache Group and the Apache HTTP server project, please see <<http://www.apache.org>>.

As is also well known, PHP is a server-side scripting language for creating dynamic web pages. When a visitor opens the page, the server processes the PHP commands and then sends the results to the visitor's browser, just as with ASP (i.e., "Active Server Pages", a feature available to users of the Microsoft Internet Information Server (IIS)) or Cold-Fusion (a product developed by Allaire Corporation, Cambridge, Mass. U.S.A.). Unlike ASP or ColdFusion, however, PHP is an "open source" and cross-platform. PHP runs on Windows NT and many UNIX versions, and it can be built as an Apache module and as a binary that can run as a CGI. When built as an Apache module, as in accordance with the present invention, PHP is especially lightweight and speedy. Alternatively, system 100 may run as an Internet-based application on the RedHat LINUX version 6.1, with an Intel-based operating system.

System 100 should also preferably support the limitations of browsers such as the Netscape version 4.x and Internet Explorer versions 4.x and 5.x. Browser versions must support certain features, like JavaScript, and limitations are determined to ensure minimum requirements for system functionality. The relational database application is MySQL. SendMail is the e-mail server implemented into the system, since SendMail interfaces with PHP, and can send e-mails with altered headers.

System 100 are also able to read and parse Rich Text Format ("RTF") documents, which users upload into the system 100. RTF is one conventional format that authors will use for their manuscripts that they upload, and the system 100 must read and parse this format to perform format conversions. Additionally, the system 100 is able to read PDF documents that users upload into the system 100. PDF is another conventional format that authors will use for their manuscripts that they upload, and the system 100 must read and display this format so system users can view submitted manuscripts online. Yet another document format that the system 100 is able to read and parse is PostScript. PostScript is a widely used format that authors will use for their manuscripts that they unload. Accordingly, the system 100 must read and parse this format to perform format conversions.

The system 100 is able to convert uploaded manuscripts to web-based (e.g., HTML) and PDF formats. These conventional formats are typically used for presentation purposes, so that system users can view submitted manuscripts online. Similarly, the system 100 is able to convert web-based pages into PDF format, to allow for consistent printing of web-based manuscripts, report screens, and other selected web pages desired and/or required for printing.

The system 100 should support text and special characters entered into web forms. Users will, thus, be able to enter metadata into web forms either by typing directly or copying and pasting from word processors for text) or entering specified codes for special characters. This data will then be captured in the database 101 and displayed for presentation or other purposes.

The system 100 is able to accept various image formats (e.g., GIF, TIF, MPEG, PNG) that users upload into the system 100. This is due to the fact that users will upload a variety of image formats for figures, tables, graphs, and equations that supplement the text of their manuscripts. The system 100 must, accordingly, read these formats to perform format conversions to JPEG (.jpg) files for online presentation and display.

Preferably, the system 100 is able to submit a user-entered credit card number to an automated credit checking service online via the Internet. When users enter credit card numbers to purchase service, pay a fee, etc., the credit card are authorized. The system 100 are also able to read and parse the results from a credit checking service when it responds to a credit card number submission. Before providing users with what they are attempting to acquire or otherwise pay for, the system 100 must correctly identify that their credit card is valid.

Creating an Account

For publishers who wish to allow users to create their own accounts when they first access the system 100, a defined process is implemented to gather information from users and then create a user account with a defined level of access to the system. Administrative personnel will have the opportunity to grant additional access to specific users whenever necessary. When users opt to create an account by clicking on the Create An Account button 505 (or any other similar such linked field), they will be shown a window that prompts for information about the user. A typical window 600 prompting a user for information is shown in FIG. 6. Publishers may choose to make specific fields optional or required, and may choose to remove or add a field to this page. Required fields are indicated with bold typeface. Instructions 601 are also provided.

A plurality of fields 602 initially prompt the user for name information (e.g., Salutation (e.g., Dr., Mr.); First Name; Middle Initial; Last Name; Suffix (e.g., Jr., Esq.)). The publisher preferably determines of these fields is present and while ones is mandatory. First Name and Last Name should always be required. A plurality of other fields 603 prompt the user for other information. For example, the Institution fields prompt the user for institution affiliation (e.g., Institution name and Department name). Various other contact information prompt for user's location and other contact information (e.g., Address 1; Address 2; City; State; Zip; Country (which may be drop down); Phone; Fax; E-mail; $2^{nd}$ E-mail). The $2^{nd}$ E-mail address includes a radio button option to specify whether this address is used for e-mail communications.

In addition to such contact information, window 600 may include the following. User Index Information fields (not shown) prompt for user's professional interests and associations. This can be especially helpful for example, to allow other users to search upon users' interests and expertise. A Key Words field permits users to enter as many key words that describe him/herself as desired. These key words are separated by commas or by carriage returns. A Membership Information field in the form of a Yes/No radio button selection lets the user specify if he/she is a member of the client organization, and the user ID field lets a user enter a preferred user ID.

If a user enters a preferred user ID, the system will verify that user ID has not already been selected by another user. If so, the user will be prompted to enter another ID. If the user does not enter a user ID, then the system will create an ID, which typically is based on the user's e-mail address (which is usually a required field). A Submit Information button may be used to permit the user to get a user account when all the required fields are filled out. Selecting this button will verify that the user fills out all required fields. If all required fields are appropriately filled out, then all entered information will be saved and the user will be taken to the next window in the process of creating an account. A Return to the Log-In Screen button can be used to allow a user to return to the Log In window without requesting a new user account. However, selecting this option will discard any information the user has entered into any of the fields.

Entering the System

When the system 100 users successfully log in to the system, they will be shown a main menu 700 as shown in FIG. 7. Specific main menu options that are displayed to the user depend upon the user's level of access as determined by his or her member organization or society 701. Each of the possible menu options are called centers, and each center is associated with a particular role of the various types of end-users for whom the system 100 is intended.

The main menu window 700 provides a user with options to centers that correspond to the various roles they perform in the submission, peer review and decision-making processes facilitated by the system 100. Brief instructions 702 are typically found at the top of the main menu window 700.

An Author center field 703 is a hyperlink to the Author center module 106 (FIG. 1). This link takes users to the module where manuscripts may be submitted for consideration for publishing. Most users will have access to this module. This is the lone, default center to which users are given access when they create their own user account. A Reviewer center field 704 is a hyperlink to the Reviewer center module 109. This link takes users to the module where they may open, review, make comments on, and rate manuscripts on which they are tasked as reviewers. Users who are slated as potential manuscript reviewers will be provided with this link. An Editor center field 705 is a hyperlink to the Editor center module 110. This link takes users to the module where they may assign and coordinate reviewers for a manuscript, and make decisions as to whether a manuscript is approved or rejected. An Editor-In-Chief center field 706 is a hyperlink to the Editor-In-Chief center module 108. This link takes users to the module where they may assign manuscripts to editors and manage user accounts, and is typically only accessible to the one individual who the Editor-In-Chief for the particular journal. An Admin Center field 707 is a hyperlink to the administrative module 107. This link takes users to the module where they may administer user accounts, manage system behavior, and view reports on manuscript submission and review status. An Exit System button 714 is a button that users can select to log out and exit the system 100. Selecting this button logs a user out of the system 100 and returns the user to the Log In window.

Figure 18:
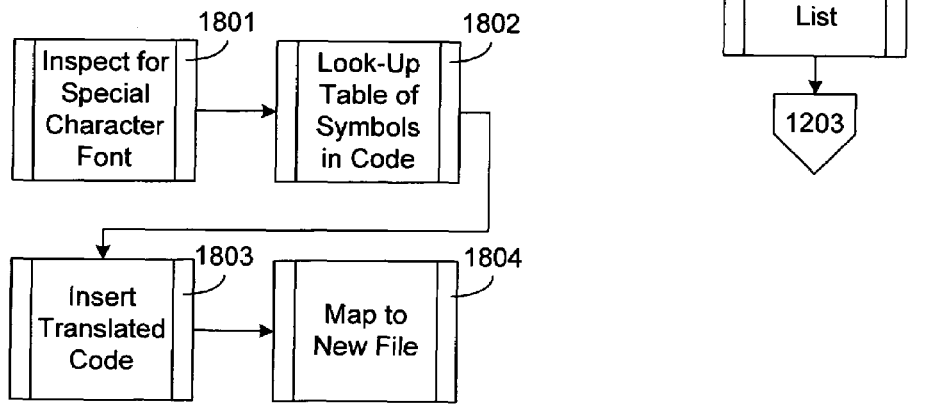
FIG. 18 shows a flowchart of a special character translation application according to the present invention.

Referring now to FIG. 18, a flowchart illustrating a special character translation application which may used in the system and methods according to the present invention will now be explained. The system 300 first inspects submitted manuscripts for special character fonts at step 1801. That is, some authors may choose to use "custom" or non-standard fonts which include special characters not recognized by standard word processing formats (e.g., RTF). The system 300 includes a look-up table (not shown) of known conversions for such custom and non-standard fonts, and at step 1802 system 300 looks up any special characters detected upon the inspection carried out at step 1801. It then inserts translated codes (which themselves are standard) from the look-up table at step 1803, and maps the manuscript with the translated codes to a new file at step 1804.

Various modifications of the methods and systems disclosed herein above are possible without departing from the true spirit and scope of the present invention. For example, in the foregoing description where the use of the phrase " . . . the system 300 prompts the user with the question that . . . ", other means such as buttons and hyperlinks may provide this functionality. It is understood, therefore, that within the scope of the following claims, the present invention may be practiced otherwise than as has been specifically described in the foregoing embodiments.

What I claim as my invention is:

1. A computer-implemented method for managing and reviewing documents, said method:

providing a submission module to enable a submitter to provide a submission for publication consideration to the system providing an administrative module to enable administration of the system, providing a chair module to enable delegation of review and approval of the submission, providing a review module to enable review of the submission, and providing a planning module to enable scheduling a presentation relating to content of said submission during said meeting characterized in that said submission module being adapted to upload text and graphics, accept flexible submission file formats, produce at least one selectable output format of said submission, produce complete proofs of said submission for user approval, shield an identity of at least one reviewer from said submitter of said submission, capture data to facilitate a peer review process, enable immediate review of said submission, display submission status at any time, and generate automatic email correspondence;

said administrative module being adapted to search a database and display results, track said submission, track author data, track reviewer and chairperson data and performance, track decisions, automatically notify late reviewers/chairpersons, grant or change user permissions, and download said submission for editing and production;

said chair module being adapted to display full text and graphics for review of said submission, enter accept/reject/revise decisions into the database at any stage, search for and select reviewers from the database, view reviewer history and current workload, invite reviewers to review all aspects of said submission, add comments/notes to said submission, and generate automatic email correspondence;

said review module being adapted to provide all aspects of said submission to said reviewer for peer review, provide a common score sheet specific to a meeting to an chairperson, and enable entry of accept/reject/revise recommendations for said submission into the database.

2. The method of claim 1, wherein said providing an administrator module step further comprises:

receiving order decisions that provide at least an arrangement for said manuscript in at least one publication; and determining contents of said at least one publication based on said order decisions.

3. The method of claim 1, wherein said manuscript includes data in the form of text, images, graphics, or multimedia.

4. The method of claim 1, wherein when said plurality of submissions includes correspondence having at least one of information about an author, subject matter of said manuscript, proposed publication dates, or proposed publications.

5. The method of claim 1, wherein said providing a chair module further comprising enabling a chairperson to at least one of add delete, change or select reviewers from the database by at least one of said plurality of clients.

6. The method of claim 1, wherein a computer system automatically produces a list of reviewers from said database.

7. The method of claim 1, wherein said reviewers are based on qualifying criteria, wherein said qualifying criteria includes at least one of (i) a reviewer's area of specialty, (ii) a reviewer's prior review history, (iii) a reviewer's professional associations, (iv) a reviewer's availability, or (v) said author's preference for or against at least one reviewer.

8. The method of claim 1, wherein said computer system providing a submission module step requires authentication of identity from at least one of a plurality of clients.

9. The method of claim 1, wherein said providing a manuscript step requires at least one of identification or authentication.

10. The method of claim 1, said receiving providing a review module step further comprises:

receiving a revision to said manuscript, wherein the author of said manuscript provided said revision based on said received at least one review; and providing said revision to at least one reviewer for additional review.

11. The method of claim 1, further comprising providing a plurality of clients access to said modules via at least one of the Internet, an extranet, or an intranet.

12. The method of claim 1, wherein said providing a review module step further comprising reporting acceptability information compiled from a received at least one review.

13. The method of claim 1, wherein an identity of said author and at least one reviewer are not provided with said manuscript to at least one of a plurality of clients.

14. The method of claim 1, wherein an identity of an author and at least one reviewer who agrees to review said manuscript are not provided to at least one of a plurality of clients.

15. The method of claim 1, wherein said providing an administrative module step further comprises providing access to predetermined content of said manuscript.

16. The method of claim 1, further comprising publishing predetermined content from said database.

17. The method of claim 1, further comprising enabling receipt of said submission in a plurality of different formats.

18. The method of claim 1, wherein the review module further comprises enabling multiple reviewers to review all aspects of said submission simultaneously.

19. The method of claim 1, further comprising shielding an identity of said author from at least one reviewer.

20. A computer program product comprising a computer useable medium including control logic stored therein, said control logic enabling management and review of documents, said control logic, when executed by a processor, causes the processor to carry out steps comprising:

providing a submission module to enable a submitter to provide a submission to the system, providing an administrative module to enable administration of the system, providing a chair module to enable delegation of review and approval of the submission, providing a review module to enable review of all aspects of the submission, providing a planning module to enable scheduling a presentation relating to content of said submission during said meeting characterized in that said submission module being adapted to upload text and graphics, accept flexible submission file formats, produce at least one selectable output format of said submission, produce complete proofs of said submission for user approval, shield an identity of at least one reviewer from said submitter of said submission, capture data to facilitate a peer review process, enable immediate review of said submission, display submission status at any time, and generate automatic email correspondence;

said administrative module being adapted to search the database and display results, track said submission, track author data, track reviewer/chairperson data and performance, track decisions, automatically notify late reviewers/chairpersons, grant or change user permissions, and download said submission for editing and production;

said chair module being adapted to display full text and graphics for review of said submission, enter accept/reject/revise decisions into the database at any stage, search for and select reviewers from the database, view reviewer history and current workload, invite reviewers to review all aspects of said submission, add comments/notes to said submission, and generate automatic email correspondence;

said review module being adapted to provide all aspects of said submission to said reviewer for peer review, provide a common score sheet specific to a meeting to an chairperson, and enable entry of accept/reject/revise recommendations for said submission into the database.

21. The computer program product of claim 20, wherein said managing and reviewing software further causes the processor to carry out steps comprising:

enabling the control logic to receive order decisions from at least one staff person, wherein said order decisions provide at least an arrangement for said manuscript in said at least one publication; and enabling the control logic to determine contents of said at least one publication based on said order decisions.

22. The computer program product of claim 20, wherein said manuscript includes data in the form of text, images, graphics, or multimedia.

23. The computer program product of claim 20, wherein said plurality of submissions includes correspondence having at least one of information about an author, subject matter of said manuscript, proposed publication dates, or proposed publications.

24. The computer program product of claim 20, wherein additions, deletions, changes or selections from said reviewers are provided to said database by a chairperson via at least one of said plurality of clients.

25. The computer program product of claim 20, wherein a computer system automatically produces a list of reviewers to a chairperson from said database.

26. The computer program product of claim 20, wherein at least one of said plurality of clients produces a list of reviewers.

27. The computer program product of claim 20, wherein said list of reviewers is based on qualifying criteria, wherein said qualifying criteria includes at least one of (i) a reviewer's area of specialty, (ii) a reviewer's prior review history, (iii) a reviewer's professional associations, (iv) a reviewer's availability, or (v) said author's preference for or against at least one reviewer.

28. The computer program product of claim 20, wherein a computer system requires authentication of identity from at least one of a plurality of clients.

29. The computer program product of claim 20, wherein said providing a submission module step further requires at least one of identification or authentication.

30. The computer program product of claim 20, wherein said providing a review module step further comprises:

enabling the control logic to receive a revision to said manuscript, wherein the author of said manuscript provided said revision based on said received at least one review; and enabling the control logic to provide said received revision to at least one reviewer for additional review.

31. The computer program product of claim 20, wherein said plurality of clients accesses said modules via at least one of the Internet, an extranet, or an intranet.

32. The computer program product of claim 20, wherein said providing a review module step further reports acceptability information compiled from said at least one review.

33. The computer program product of claim 20, wherein information about at least one of an author or at least one reviewer is not provided with said manuscript to at least one of a plurality of clients.

34. The computer program product of claim 20, wherein an identity of an author and at least one reviewer who agrees to review said manuscript are not provided to at least one of a plurality of clients.

35. The computer program product of claim 20, wherein said managing and reviewing software when executed by the processor, further causes the processor to carry out steps including publishing predetermined content from said database.

36. The computer program product of claim 20, further comprising enabling receipt of said submission in a plurality of different formats.

37. The computer program product of claim 20, wherein the review module further comprises enabling multiple reviewers to review all aspects of said submission simultaneously.

38. The computer program product of claim 20, further comprising shielding an identity of said author from at least one reviewer.

39. A system for managing and reviewing documents, said system comprising:

a processor;

a memory; and a database, wherein said memory carries thereon managing and reviewing software comprising:

a submission module to enable a submitter to provide a manuscript to the system, said submission module being adapted to upload text and graphics, accept flexible submission file formats, produce at least one selectable output format of said submission, produce complete proofs of said submission for user approval, shield an identity of at least one reviewer from said submitter of said submission, capture data to facilitate a peer review process, enable immediate review of said submission, display submission status at any time, and generate automatic email correspondence;

an administrative module to enable administration of the system, said administrative module being adapted to search the database and display results, track said submission, track author data, track reviewer/chairperson data and performance, track decisions, automatically notify late reviewers/chairpersons, grant or change user permissions, and download said submission for editing and production;

a chair module to enable delegation of review and approval of the submission, said chair module being adapted to display full text and graphics for review of said submission, enter accept/reject/revise decisions into the database at any stage, search for and select reviewers from the database, view reviewer history and current workload, invite reviewers to review all aspects of said submission, add comments/notes to said submission, and generate automatic email correspondence;

a review module to enable review of all aspects of the submission, said review module being adapted to provide all aspects of said submission to said reviewer for peer review, provide a common score sheet specific to a meeting to an chairperson, and enable entry of accept/reject/revise recommendations for said submission into the database; and a planning module to enable scheduling a presentation relating to content of said submission during said meeting.

40. The system of claim 39, said where said providing a submission module further comprises:

receiving order decisions from at least one staff person, wherein said order decisions provide at least an arrangement for said manuscript in said at least one publication; and determining contents of said at least one publication based on said order decisions.

41. The system of claim 39, wherein said manuscript includes data in the form of text, images, graphics, or multimedia.

42. The system of claim 39, wherein when said plurality of submissions includes correspondence that includes at least one of information about said author, subject matter of said manuscript, proposed publication dates, or proposed publications.

43. The system of claim 39, wherein additions, deletions, or selections from said list of reviewers in said database are provided to a chairperson by at least one of a plurality of clients.

44. The system of claim 39, wherein said computer system automatically produces a list of reviewers to a chairperson from said database.

45. The system of claim 39, wherein at least one of a plurality of clients produces a list of reviewers.

46. The system of claim 39, wherein a list of reviewers is based on qualifying criteria, wherein said qualifying criteria includes at least one of (i) a reviewer's area of specialty, (ii) a reviewer's prior review history, (iii) a reviewer's professional associations, (iv) a reviewer's availability, or (v) said author's preference for or against at least one reviewer.

47. The system of claim 39, wherein a computer system requires authentication of identity from at least one of a plurality of clients.

48. The system of claim 39, wherein said providing a submission step further requires at least one of identification or authentication.

49. The system of claim 39, wherein said providing a chair module step further comprises:

receiving a revision to said manuscript, wherein the author of said manuscript provided said revision based on a received at least one review; and providing said received revision to said at least one reviewer for additional review.

50. The system of claim 39, wherein a plurality of clients accesses said computer system modules via at least one of the Internet, an extranet, or an intranet.

51. The system of claim 39, wherein said providing a review module step further reports acceptability information compiled from at least one review.

52. The system of claim 39, wherein an identity of at least one of an author or at least one reviewer is not provided with said manuscript to at least one of a plurality of clients.

53. The system of claim 39, wherein an identity of an author and at least one reviewer who agrees to review said manuscript are not provided to at least one of a plurality of clients.

54. The system of claim 39, wherein said providing said submission module further provides access to predetermined content of said manuscript.

55. The system of claim 39, wherein said managing and reviewing software, when executed by the processor, further causes the processor to carry out steps including predetermined content from said database.

56. The system of claim 39, further comprising enabling receipt of said submission in a plurality of different formats.

57. The system of claim 39 wherein the review module further comprises enabling multiple reviewers to review all aspects of said submission simultaneously.

58. The system of claim 39, further comprising shielding an identity of said author from at least one reviewer.

* * * * *